US009370704B2

(12) United States Patent
Marty

(10) Patent No.: US 9,370,704 B2
(45) Date of Patent: Jun. 21, 2016

(54) TRAJECTORY DETECTION AND FEEDBACK SYSTEM FOR TENNIS

(71) Applicant: Pillar Vision, Inc., Menlo Park, CA (US)

(72) Inventor: Alan W Marty, Menlo Park, CA (US)

(73) Assignee: PIllar Vision, Inc., Menlo Park, CA (US)

( * ) Notice: Subject to any disclaimer, the term of this patent is extended or adjusted under 35 U.S.C. 154(b) by 141 days.

(21) Appl. No.: 14/167,876

(22) Filed: Jan. 29, 2014

(65) Prior Publication Data

US 2014/0180451 A1    Jun. 26, 2014

Related U.S. Application Data

(63) Continuation-in-part of application No. 13/745,429, filed on Jan. 18, 2013, which is a continuation of application No. 12/015,445, filed on Jan. 16, 2008, now Pat. No. 8,409,024, which is a continuation-in-part of application No. 11/508,004, filed on Aug. 21, 2006, now Pat. No. 7,854,669.

(60) Provisional application No. 60/880,773, filed on Jan. 16, 2007, provisional application No. 61/758,187, filed on Jan. 29, 2013.

(51) Int. Cl.
| | |
|---|---|
| A63F 9/24 | (2006.01) |
| A63B 69/38 | (2006.01) |
| A63B 24/00 | (2006.01) |
| A63B 15/00 | (2006.01) |
| G06F 3/01 | (2006.01) |
| G06K 9/00 | (2006.01) |
| A63B 71/06 | (2006.01) |

(52) U.S. Cl.
CPC ............... *A63B 69/38* (2013.01); *A63B 15/00* (2013.01); *A63B 24/0003* (2013.01); *A63B 24/0021* (2013.01); *A63B 24/0062* (2013.01); *A63B 24/0084* (2013.01); *A63B 60/16* (2015.10); *G06F 3/016* (2013.01); *G06K 9/00342* (2013.01); *G06K 9/00671* (2013.01); *A63B 2024/0009* (2013.01); *A63B 2024/0031* (2013.01); *A63B 2024/0034* (2013.01); *A63B 2024/0037* (2013.01); *A63B 2071/0625* (2013.01); *A63B 2071/0655* (2013.01); *A63B 2071/0663* (2013.01); *A63B 2102/02* (2015.10);

(Continued)

(58) Field of Classification Search
None
See application file for complete search history.

(56) References Cited

U.S. PATENT DOCUMENTS

| | | | | |
|---|---|---|---|---|
| 7,775,883 B2 * | 8/2010 | Smoot | ..................... | A63F 13/00 463/30 |
| 8,337,312 B1 * | 12/2012 | Jones | ...................... | A63F 13/10 463/31 |

(Continued)

*Primary Examiner* — Paul A D'Agostino
(74) *Attorney, Agent, or Firm* — Maynard Cooper & Gale, P.C.; Jon Holland

(57) ABSTRACT

A system for capturing and analyzing a trajectory of a tennis ball or other object associated with a play of a game of tennis and providing feedback is described. The system may be designed to capture and analyze a trajectory of a tennis ball during various activities related to the play of a game of tennis. The system may be configured to provide immediate feedback that may be utilized by a player to improve their performance as well as provide entertainment value above and beyond what is normally associated with the play of a game of tennis. Further, the system may be operable for use in an area where tennis is normally played during normal playing activities, such as player playing a game or practicing on an outdoor tennis court. The system may be operable to account for factors associated with its ambient environment, such as wind, temperature and humidity.

38 Claims, 11 Drawing Sheets

(52) U.S. Cl.
CPC ........ *A63B 2102/06* (2015.10); *A63B 2102/16* (2015.10); *A63B 2209/10* (2013.01); *A63B 2220/00* (2013.01); *A63B 2220/10* (2013.01); *A63B 2220/12* (2013.01); *A63B 2220/16* (2013.01); *A63B 2220/30* (2013.01); *A63B 2220/40* (2013.01); *A63B 2220/72* (2013.01); *A63B 2220/75* (2013.01); *A63B 2220/806* (2013.01); *A63B 2220/83* (2013.01); *A63B2220/833* (2013.01); *A63B 2225/20* (2013.01); *A63B 2225/50* (2013.01)

(56) References Cited

U.S. PATENT DOCUMENTS

| | | | |
|---|---|---|---|
| 8,622,832 B2 * | 1/2014 | Marty | A63B 24/0003 463/36 |
| 8,992,322 B2 * | 3/2015 | Endo | A63F 13/06 463/37 |
| 2005/0017454 A1 * | 1/2005 | Endo | A63F 13/06 273/317.1 |
| 2011/0190052 A1 * | 8/2011 | Takeda | A63F 13/02 463/31 |
| 2012/0106041 A1 * | 5/2012 | Ashida | A63F 13/02 361/679.01 |
| 2013/0095924 A1 * | 4/2013 | Geisner | A63F 13/00 463/32 |
| 2013/0117377 A1 * | 5/2013 | Miller | H04L 67/38 709/205 |
| 2015/0097719 A1 * | 4/2015 | Balachandreswaran | G01B 11/002 342/147 |
| 2015/0258432 A1 * | 9/2015 | Stafford | A63F 13/213 463/32 |

* cited by examiner

TRAJECTORY DETECTION AND FEEDBACK SYSTEM FOR TENNIS

CROSS-REFERENCE TO RELATED APPLICATIONS

This application claims priority under 35 U.S.C. §120 and is a Continuation-in-Part application of co-pending U.S. patent application Ser. No. 13/745,429, filed Jan. 18, 2013, by Marty et al., which claims priority under 35 U.S.C. §120 and is a Continuation of U.S. patent application Ser. No. 12/015,445, filed Jan. 16, 2008, now U.S. Pat. No. 8,409,024, which claims priority under 35 U.S.C. §119(e) to U.S. Provisional Patent Application No. 60/880,773, filed on Jan. 16, 2007. U.S. patent application Ser. No. 12/015,445 further claims priority under 35 U.S.C. §120 and is a Continuation-in-Part application of U.S. patent application Ser. No. 11/508,004, filed Aug. 21, 2006, now U.S. Pat. No. 7,854,669. This application further claims priority under 35 U.S.C. §119(e) to U.S. Provisional Patent Application No. 61/758,187, filed Jan. 29, 2013, by Marty. Each of the above provisional applications, non-provisional applications and patent are incorporated herein by reference in their entirety and for all purposes. The following two U.S. patents and three provisional applications are incorporated by reference in their entirety and for all purposes: i) U.S. Pat. No. 7,854,669, ii) U.S. Pat. No. 7,094,164, iii) U.S. Provisional Patent Application 60/323,029, .iv) U.S. Provisional Patent Application 60/348,057 and v) U.S. Provisional Patent Application 60/395,875.

TECHNICAL FIELD

The present invention relates generally to devices and systems for sports training and entertainment and more specifically to a trajectory detection and feed back systems and associated methods for tennis.

BACKGROUND

In regards to tennis, there is a lack of training devices that allow for tennis players to train muscle memory for the tennis serve, volleys or ground strokes on-court or off-court in a manner that is measurable and repeatable. For example, there are no simple, non-intrusive, cost effective ways for tennis players to know whether their practice serves, volleys or ground strokes are being correctly reproduced during matches, to measure muscle memory consistency in their serves, volleys and ground strokes when ball results are impacted by wind, temperature, humidity, ball type/age, altitude, etc. or to keep track of their serve, volley or ground stroke accuracy over many different training and playing sessions. Further, for players that enjoy games or are motivated by competition, there are no simple, non-intrusive, cost effective ways to compete with themselves or with each other in one location or with each other in multiple locations while using their own unmodified racquets and unmodified ball in a normal tennis environment (court), such as within the context of video game utilizing data measured during their actual game play. In the following paragraphs, system, apparatus and method that may satisfy the issues described above are described.

SUMMARY

A system for capturing and analyzing a trajectory of a tennis ball or other object associated with a play of a game of tennis and providing feedback is described. The system may be designed to capture and analyze a trajectory of a tennis ball during various activities related to the play of a game of tennis including serves and ground-strokes. The system may be configured to provide immediate feedback that may be utilized by a player to improve their performance as well as provide entertainment value above and beyond what is normally associated with the play of a game of tennis.

One aspect of the present invention relates to a device for analyzing a trajectory of a tennis ball. The device may be characterized as comprising: 1) one or more cameras for recording video frame data used to characterize a trajectory of a tennis ball generated by a player during a tennis related activity; 2) a logic device designed or configured to i) receive the video frame data, ii) identify the tennis ball in the video frame data, iii) generate trajectory parameters that characterize one or more states of the tennis ball along its trajectory and iv) generate feedback information using the trajectory parameters; and 3) at least one output mechanism for providing the feedback information to the player in real-time. In particular embodiments, the device may include two cameras or a stereoscopic camera. These cameras may be utilized as part of a machine vision system.

The tennis related activity may be a toss of the tennis ball for a serve and where the logic device is further designed or configured to determine the trajectory of the tennis ball during the toss and prior to impact with a racquet. The feedback information may be related to the trajectory of the tennis ball during the toss. In addition, the logic device may be further designed or configured to determine the trajectory of the tennis ball after impact with the racquet where the feedback information is related to the trajectory of tennis ball after the impact of the racquet. Further, the feedback information may include information related to the trajectory of the tennis ball during the toss and may include information related to the trajectory of the tennis ball after impact with the racquet. In other example, the activity associated with the game of tennis may be a ground-stroke and where the logic device is further designed or configured to determine one or more of the trajectory of the tennis ball prior to impact with a racquet, the trajectory of the tennis ball during impact with the racquet, the trajectory of the tennis ball after impact with the racquet or combinations thereof and to provide feedback information related to one or more of the trajectories.

The feedback information may be derived from a simulated trajectory of the tennis ball or may be directly measured by the device. In particular embodiments, the feedback information may include one or more of the following 1) a height of a serve toss, 2) a lean of the serve toss, 3) a spin of the serve toss, 4) a consistency of a plurality of serve tosses, 5) an impact position height of a serve, 6) an impact position lean of the serve, 7) a consistency of an impact position of a plurality of serves, 8) an initial speed of the serve, 9) an initial angle of the serve, 10) an initial direction of the serve, 11) an initial spin of the serve, 12) a consistency of the initial speed of the plurality of serves, 13) a consistency of the angle of serve of the plurality of serves, 14) a consistency of the direction of the plurality of serves, 15) a consistency of the spin of the plurality of serves, 16) a calculated speed of the serve, 17) a consistency of the calculated speed of the plurality of serves, 18) a calculated landing speed of the serve, 19) a location of the serve at landing, 20) a spin of the serve at landing, 21) a direction vector of the serve at landing, 22) a consistency of the calculated landing speed for the plurality of serves, 23) a consistency of the location at landing of the plurality of server, 24) a consistency of the spin at landing of the plurality of serves, 25) a consistency of the direction vector of the plurality of serves, 26) a measured landing speed of the serve, 27) a measured location of the serve, 28) a measured spin of the serve, 29) a measured direction vector of the serve, 30) a consistency of the measured landing speed of the plurality of serves, 31) a consistency of the measured location of the plurality of serves, 32) a consistency of the spin measured for the plurality of serves, 33) a consistency of the direction vector measured for the plurality of serves, 34) a height above or below a net of the tennis ball, 35) a location of the crossing point of the net of the tennis ball, 36) a release location of the serve toss and 37) combinations thereof.

In other embodiments, the activity associated with the game of tennis may be a ground-stroke and where the logic device is further designed or configured to determine one or more of the trajectory of the tennis ball prior to impact with a racquet, the trajectory of the tennis ball during impact with the racquet, the trajectory of the tennis ball after impact with the racquet or combinations thereof and to provide feedback information related to one or more of the trajectories. The logic device may be further designed or configured to identify a boundary line associated with a tennis court in the video frame data where the logic device is further designed or configured to determine a position of the device relative to the tennis court using information associated with the identified boundary line for calibration purposes. In addition, the logic device is further designed or configured to determine the position of the tennis ball relative to the boundary line.

In yet other embodiments, the logic device may be further designed or configured to identify a position of a body element of the player participating in the tennis related activity in the video frame data and to determine the position of the body element relative to the boundary line. Further, the logic device may be further designed or configured to identify a net associated with a tennis court including an upper edge of said net in the video frame data. A position of the device relative to the net may be utilized for calibration purposes. In addition, the logic device may be further designed or configured to determine a position of the tennis ball relative to the upper edge of said net.

In some instances, the logic device may be further designed or configured to determine whether a tennis ball hit by a player on a tennis court is inside of or outside of one or more boundary lines associated with the tennis court. Also, the logic device may be further designed or configured to output feedback information to the player indicating whether the tennis ball is insider or outside of the one or more boundary lines with the feedback information generated using the trajectory parameters or at least store this information.

The logic device may further designed or configured to determine the trajectory parameters associated with a two-dimensional trajectory for the tennis ball or to determine the trajectory parameters associated with a three-dimensional trajectory for the tennis ball. The logic device may be further designed or configured to determine one or more of a spin rate, a spin direction or combinations thereof of the tennis ball for at least one point along its trajectory. Further, the logic device may be designed or configured to identify a racquet in the video frame data and to determine a position of the racquet, a velocity of the racquet, an orientation of the racquet as a function of time or combinations thereof as a function of time. Also, the logic device may be designed or configured to identify a body element of the player participating in the tennis related activity in the video frame data and to determine a position of the body element, an orientation of the body element, a velocity of the body element or combinations thereof, as a function of time and to provide feedback information related to one or more of the position of the body element, the orientation of the body element or the velocity of the body element to a user.

The device may comprise one or more sensors for determining an orientation of the device where the one or more sensors may comprise accelerometers or tilt sensors. These sensors may be utilized during calibration of the device. The logic device may be designed or configured to determine, for the purposes of calibration, a distance from the device to one or more of the tennis ball, a racquet, a boundary line on the tennis court, a net on the tennis court, a vertical surface against which the tennis ball is being hit or a player hitting the tennis ball.

In further embodiments, the output mechanism may be a wireless interface for outputting the feedback information to one or more remote devices where the remote device may be worn by a player participating in the activity associated with game of tennis. The device may be operable to output feedback information to a plurality of player simultaneously, such as a player hitting a serve and a player receiving a serve. In another embodiment, the output mechanism may be an audio device coupled to a display.

The device may comprise a housing for the one or more cameras, the logic device, and the at least one output mechanism. The housing may have a weight and a form factor, which facilitate one or more of transport, storage, unobtrusive set-up, calibration, or operation of the device. A portion of the housing may comprise a bag. The device may be portable. For instance, the device may include wheels that allow the device to pulled or pushed by a user along the ground or handle that allows the device to be carried. The device may include an input mechanism. The input mechanism may be a touch screen display. The input mechanism may be a wireless interface for receiving input from a remote device.

The logic device may be a general purpose computer comprising one or more of a processor, a data storage device, RAM, operating system software, device interfaces, device drivers, trajectory analysis software, machine vision software and combinations thereof. The memory storage device may be for storing trajectory session information wherein the trajectory session information comprises one or more of 1) digitized video frame data, trajectory information and feedback information generated for a plurality of trajectories, 2) a trajectory session time, 3) a trajectory session date, 4) a trajectory session location or combinations thereof. The logic device may be further designed or configured to store data related to one or the trajectory of the tennis ball, movements of the player, movements of a racquet captured in the video frame data for use in a video simulation related to tennis where the video simulation of the player is generated using the stored data.

The device may be capable of one of autonomous set-up, autonomous calibration, autonomous operation or combinations thereof. In some instances, after manual input of data by a user, a confirmation of data determined by the device, the logic device is further designed or configured to complete a calibration procedure. The device may be designed to determine for a plurality of related trajectories captured by the device a consistency for at least one of the trajectory parameters generated for each of the plurality of related trajectories where the consistency may be determined by calculating a statistical deviation.

Another aspect of the present invention is related to a device for analyzing a trajectory of a tennis ball. The device may be generally characterized as comprising: 1) one or more cameras for recording video frame data used to characterize a trajectory of a tennis ball generated by a player during a tennis related activity; 2) a logic device designed or configured to i) receive the video frame data, ii) to identify the tennis ball in the video frame data, iii) generate trajectory parameters that characterize one or more states of the tennis ball along its trajectory and iv) generate feedback information using the trajectory parameters; and 3) at least one output mechanism for providing the feedback information to the player in real-time; 4) a housing supporting or enclosing the one or more cameras, a logic device, and the at least the output mechanism wherein the housing and components supported or enclosed by the housing having a form factor and a weight factor that allow the device to be carried by the player. The device may be designed to be securable to a fence by the player for operation.

Yet another aspect of the present invention is related to a device for analyzing a trajectory of a tennis ball during a serve. The device may be generally characterized as comprising: 1) one or more cameras for recording video frame data used to characterize a trajectory of a tennis ball generated by a player during a serve toss, after the tennis ball is impacted by a racquet or combinations thereof; 2) a logic device designed or configured to i) receive the video frame data, ii) identify the tennis ball in the video frame data, iii) generate trajectory parameters that characterize one or more states of the tennis ball along a) a trajectory of the serve toss, b) a trajectory after impact by the racquet or combinations thereof, and iv) generate feedback information using the trajectory parameters; and 4) at least one output mechanism for providing the feedback information to the player in real-time related to the serve.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

DETAILED DESCRIPTION

In the following figures, aspects of a system that captures, analyzes and provides feedback related to tennis is described. In particular, the system may be designed to capture and analyze a trajectory of a tennis ball during various activities related to the play of a game of tennis. The system may be configured to provide immediate feedback that may be utilized by a player to improve their performance as well as provide entertainment value above and beyond what is normally associated with the play of a game of tennis. The analysis and feedback system may be portable and may be operable for use in an area where tennis is normally played, such as an outdoor tennis court. Further, the system may be designed to be non-intrusive such that a player may use the system and receive feedback during normal activities associated with the play of a game of tennis. Although described primarily in regards to tennis, the system may be also be adaptable and useful for other tennis-like sports, such as but not limited to squash, racquetball, table tennis, etc.

Figure 1:
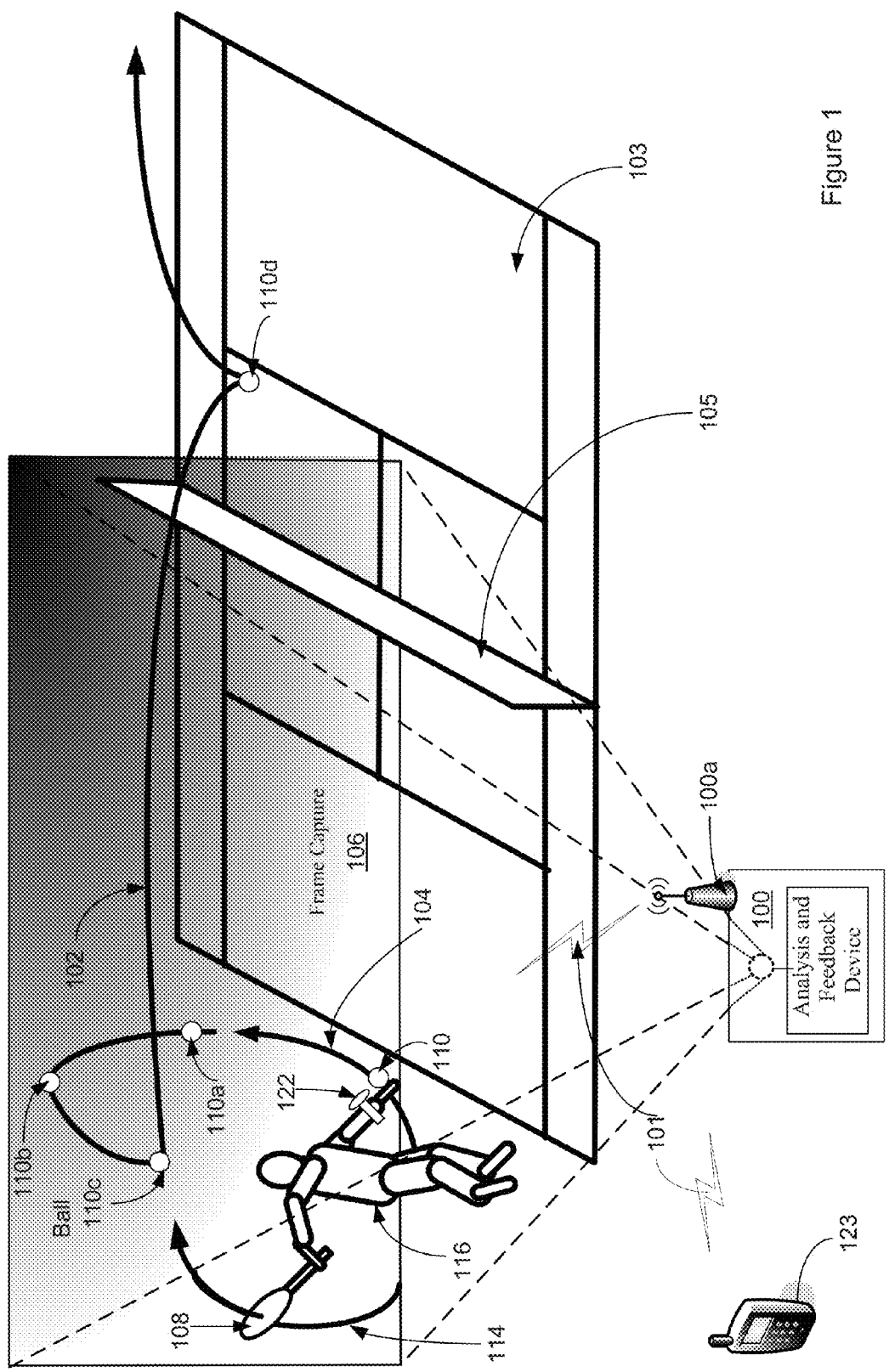
FIG. 1 is a diagram illustrating an in-situ use of trajectory detection and analysis system for tennis.
Figure 2:
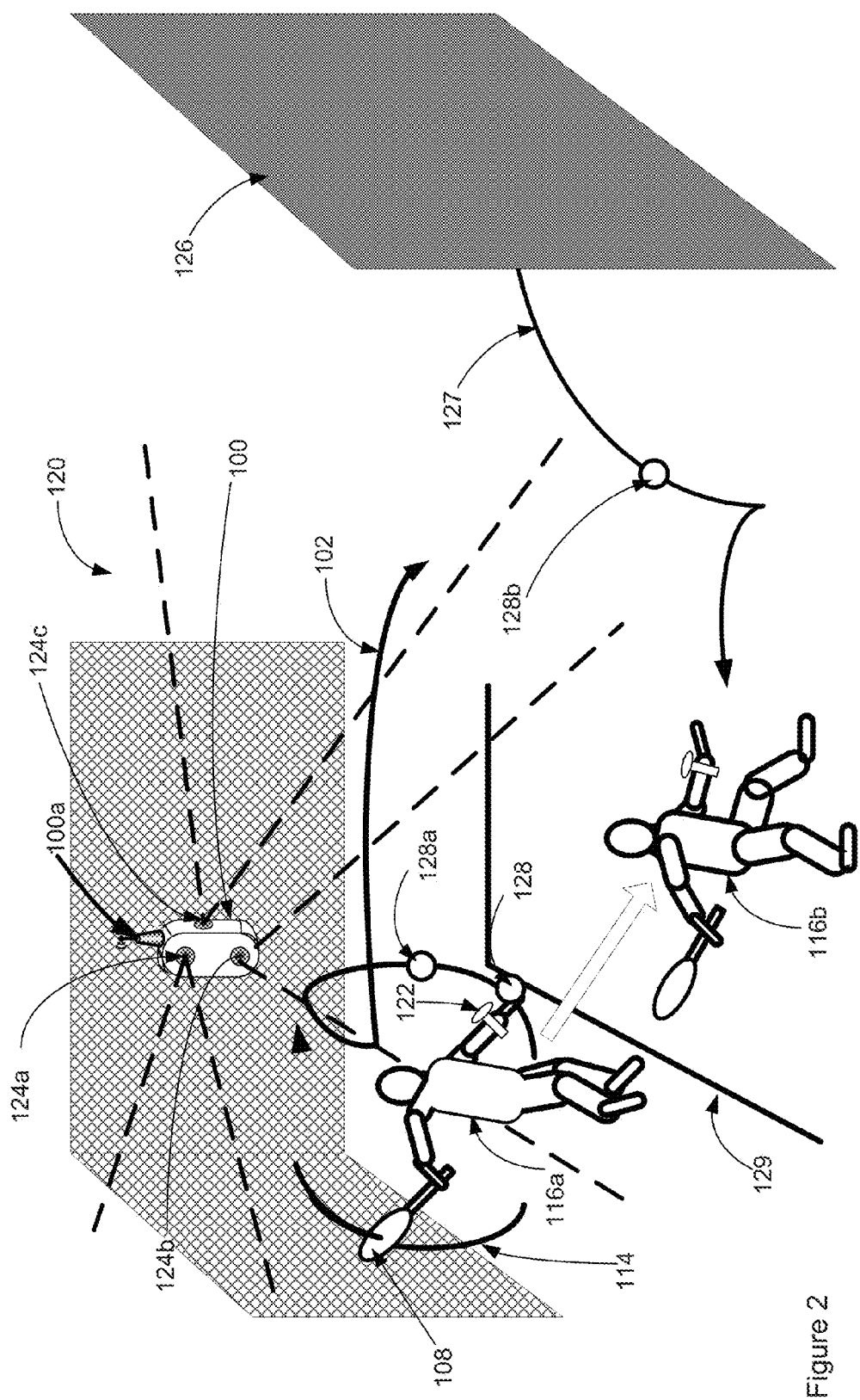
FIG. 2 is a perspective view illustrating a use of a trajectory detection and analysis system for tennis.

With respect to FIGS. 1 and 2, an in-situ use of a trajectory detection and analysis system for tennis is described. With respect to FIG. 3, a wearable feedback device is described. With respect to FIGS. 4 and 5, interface screens related to performance analysis are discussed. With respect to FIGS. 6, 7 and 8, components of an analysis and feedback system are presented for the purposes of illustration.

FIG. 1 is a diagram illustrating an in-situ use of trajectory detection and analysis system for tennis. In the FIG. 1, an analysis and feedback device and associated system 100 for analyzing a trajectory associated with the play of tennis and providing feedback may comprise one or more of the following: 1) one or more cameras (or 3D capturing sensors, such as CanestaVision™ Camera Module, Canesta, Inc., Americas Headquarters, Sunnyvale, Calif.) for recording video frame data used to characterize a trajectory (e.g., trajectory of a ball 110 along various points in its trajectory, such as at 110a, 110b, 110c and 110d), 2) a logic device (see FIGS. 6, 7A-C and 8 for more details and 3) and one or more feedback output mechanisms and associated interfaces for providing the feedback information to a user of the system (e.g., wearable device 122, cell phone 123 and wireless interface 100a). In some embodiments, the analysis feedback device may include sensors and/or an interface for measuring or inputting ambient conditions, such as temperature, humidity and wind speed.

The analysis and feedback device 100 may be designed or configured to i) receive the video frame data, ii) generate trajectory parameters that characterize one or more states of the tennis ball 110, tennis racquet 108 or a body element along its trajectory and iii) generate feedback information using the trajectory parameters. The analysis and feedback device may perform these analyzes using one or more logic devices coupled to the device 100. The analysis and feedback device 100 may be portable and may be designed to operate on or off an actual tennis court and may be self-calibrating to some extent. The device 100 may include a rechargeable energy source to power the camera(s), logic device, and/or output signal. The rechargeable energy source could be one or more of the following: battery, solar panel, fuel cell.

Some examples of trajectories captured and analyzed by the device 100, may include a trajectory 102 of a tennis ball 110 hit by a racquet 108 swung by a player 116. In further detail, the device 100 may be designed or configured to capture, analyze and provide feedback associated with but not limited to: 1) a trajectory of a tennis ball after making contact with the court (trajectory after ball 110*d* hits court, which would be different for a hard court, grass court or clay court), 2) a trajectory of a body element of the human while playing tennis (such as a trajectory 104 of player's 116 hand swinging racquet 108 or trajectory a player's hand tossing ball 100), 3) a trajectory of a tennis ball tossed by the player 116 (e.g., along trajectory including 110*a*, 110*b* and 110*c*), 4) a trajectory 114 of a section of the racquet face or handle (which may provide, the changing angles of the racquet through the time of contact with the ball) and 5) a trajectory of a tennis ball 110 after being hit by the racquet 108, but before striking the ground, such as between trajectory points 110*c* and 110*d*.

The feedback information may be derived from measurements made by the analysis and feedback device 100. For instance, the feedback information may be related to one or more of the trajectory parameters associated with a tennis ball 110. The trajectory parameters, which may be determined by the analysis and feedback device 100 may include but are not limited to one or more of the following: 1) height of a serve toss 110*b*, 2) a lean of a serve toss, 3) a spin of a serve toss, 4) consistency of a serve toss and/or spin (derived from multiple serves), 5) an impact position height of a serve 110*c*, 6) an impact position lean of a serve, 7) a consistency of an impact position of a serve, 8) an initial speed, angle, direction and/or spin of a serve, 9) consistency of initial speed, angle, direction and/or spin of a serve, 10) a calculated speed of a serve, 11) a consistency of calculated speed of a serve, 12) calculated landing speed, location 110*d*, spin, and/or direction vector of a serve, 13) a consistency of calculated landing speed location, spin, and/or direction vector of a serve, 14) a measured landing speed, location, spin and/or direction vector of a serve, 15) a consistency of measured landing speed, location, spin and/or direction vector of a serve, 16) a height above/below the net at crossing point of the net and/or the location of the crossing point of the net, 17) release location of a serve toss, 18) combinations thereof. Further, the system may be able to record and provide feedback related to shot outcomes, such as in or out, a shot location on the court, hit the net, whether a shot was successfully returned, etc.

Where applicable, information similar to that list listed above may be provided for any type of shot that may occur during normal tennis playing activities, such as ground strokes (forehand or backhand), overhead hits, volleys, service returns, etc. For example, the system may be designed or configured to provide feedback and store information related to an impact position height of a stroke, a shot velocity or spin velocity as it leaves the racquet, a consistency of a stroke parameter (such as racquet head speed) and shot results (such as in or out). During training, a player may attempt to hit shots to a particular location on court 103 and thus, the system may be designed or configured to provide a consistency/variability associated with shot placement.

The feedback information provided to a player may be related to one or more parts of a trajectory. For instance, at one time a player may wish to receive feedback information regarding their toss 110*a*-110*c*, at another time a player may wish to receive feedback information regarding their serve speed and impact height (e.g., height at 110*c*), which corresponds to the trajectory of the ball after it is tossed, at other times the player may wish to receive feedback information regarding the location where the ball lands (e.g., 110*d*), which is the later in the trajectory 102. The analysis and feedback device 123 may be operable to provide feedback information for one or more parts of the trajectory simultaneously. For instance, the device may provide an audible, such as "7, 100, in," which may correspond to a serve height of 7 feet, a serve speed of 100 miles per hour and an indication that it landed in. The analysis and feedback device may provide an interface that allows the user to select what type of feedback information they wish to receive, such as a combination of feedback parameters. In one embodiment, the feedback information may be provided to a wearable device 122 via wireless signals 101 from wireless interface 100*a*.

The device may further include an interface that may provide recommendations for feedback information to output depending on what goal a player is trying to accomplish, such as increasing speed or increasing accuracy, and possibly based upon a training regimen that a player is currently utilizing. For instance, feedback information to improve a serve may comprise mastering two or more skills, requiring two types of feedback information. Thus, when the player is mastering the first skill, the device may provide feedback information of a first type associated with the first skill. After the player has mastered the first skill, the device may provide feedback information of a second type associated with the second skill but still monitor the feedback information associated with the first skill. Thus, the device may be operable to notify the player, when after progressing to the second skill, if the device notices the player has started slipping in their mastery of the first skill.

In addition to providing feedback information to a player generating a particular shot, feedback information of a shot may be provided to a player receiving a shot. For example, parameters related to a racquet head speed or movement (e.g., movement of racquet 108 along trajectory 114) and then resultant serve speed and/or direction may be provided to a player receiving a serve. The information may or may not be provided simultaneously to the player making the serve. This feedback information or other combinations of feedback information associated with the serve may be useful in helping a player learn to return serves. For instance, feedback information associated with a racquet movement or other body movement of a player making a server may help the player to learn how to judge a speed and/or direction of the resultant serve and hence, help them to anticipate and react to serves.

In the preceding paragraph listing the trajectory parameters, any of the trajectory parameters may be normalized or modified in some manner to allow for comparisons, such as comparisons between sessions or between players. Some factors that may be considered in a normalization process may include but are not limited to ambient conditions, such as wind speed, temperature and humidity, physical characteristic of a player, such as sex, weight, age and height and skill level of a player. Normalizations involving ambient conditions may allow training sessions carried out under different training sessions to be more accurately compared. Normalizations involving physical characteristics may allow performances from players with different physical characteristics to be compared. Normalizations involving skill level may allow players of differing skill levels to compete against one another, akin to providing a handicap in golf.

In particular embodiments, the analysis and feedback device or an associated input device may be operable to allow data used for normalizations to be entered. In addition, the analysis and feedback device may be operable to measure one or more of these normalization inputs. For example, the analysis and feedback device 100 or an input device associated with the system (e.g., 122 or 123 or see FIGS. 6, 7A-C and 8 for more details) may be operable to measure an ambient temperature and/or humidity that may be used to provide normalizations for comparisons between training sessions.

In addition, the analysis and feedback device may also measure and may provide feedback on other tennis parameters related to one or more of the following: racquet head movement (e.g., 114), racquet head orientation, racquet head impact point, a lower body movement, upper body movement, feet position, such as foot fault, etc. The analysis and feedback device may associate and/or analyze these parameters as they relate to the ball trajectory results. The device may measure and provide feedback on consistency of these parameters with the same service type or across a series of service types (as well as with other stroke types). The device may also include an interface and analysis capability that allows a heart rate of the tennis player to be determined and provide feedback or analysis of this heart rate. This analysis may be provided in conjunction/combination with other feedback information, such as heart rate while serving or heart rate during good serves as compared to bad serves, etc.

The analysis and feedback device may also be operable to store the measurement of the parameters for later review, upload, analysis, display, sharing and combinations thereof. Some of these functions may be directly available on the analysis and feedback device 100 or in combinations with other devices in a real-time or off-line manner (see FIGS. 4 and 5 for an example of an interface screen that may provide such information in an on-line or off-line manner). Further, the analysis and feedback device may be operable to make a video recording of the swing(s)/serve(s) for immediate or delayed review, analysis and/or sharing.

The analysis and feedback device 100 may be operable to gather information that it uses for calibration purposes. For example, the device may be operable to sense one or more of the following: its own position, the position of the racquet, the position of the ball, the position of the court markings and net, the position of the above relative to the others. Further that the device may be operable to self-calibrate one or more of its functions while accounting for one or more of the following parameters: ball position, tennis player position, tennis racquet position, device position (its position), tilt of device, lighting, wind, humidity, type of racquet, brand of racquet, type of ball, identity of tennis player, altitude. The analysis and feedback device may include one or more sensors that allow it to determine its orientation, such as accelerometers or tilt sensors. For instance, device 100 may be operable to determine its orientation relative to a horizontal surface.

Each time, the device is used it may be placed in a different position. For example, it may be hung on a fence in a different location/orientation or placed in a different position on a playing surface, such as a tennis court. During use of the device, a user may wish to move the device 100 to a different location, which may require a recalibration of the device 100. As another example, while hung on the fence, a user may bump into it and change its orientation, in which case, the device 100 may recalibrate itself. As another example, the user may take a break and simply turn off the device and later return and power-on the device, in which case a calibration may be performed. In one embodiment, the device may store its last or previous calibration settings and may use those as a starting point or may allow the user to select a calibration setting that was previously generated to speed up the calibration process.

In some embodiments, the device 100 may be operable to automatically recalibrate itself or at least check its calibration on a periodic basis. In some instances, the recalibration may be initiated when the device is operable to detect whether it has been moved or bumped. For example, the device 100 may include sensors for detecting a movement of the device, such as accelerometers. In other instances, a calibration procedure may be initiated when a device is first turned on. It yet other embodiments, the calibration procedure may be initiated manually via input by a user.

In one embodiment, the calibration procedure may involve a manual confirmation of some data by the user. For instance, the device 100 may determine whether it is level or not and then electronically adjust its orientation, i.e., its frame capture capabilities, such that they are level with a playing surface, such as tennis court. Thus, the device 100 even though may be tilted in some manner, the captured frame data will appear correctly orientated relative to the ground when later viewed. Next, the device may attempt to identify some object on the playing surface, such as a boundary line, a net, a cone, a ball or a tennis racquet placed on the playing surface or a target placed on the playing surface. The dimensions of the boundary line or boundary lines, cone or target may or may not be known to the device 100 and the device 100 may be operable to determine the size of the object.

In some instances, the calibration procedure may require an object or target to be placed a certain distance from the device or the distance from the cone or target may be input by the user. Also, the size of the object or the target may be optionally input by the user. If the device is placed on a playing surface with boundary lines, such as a tennis court of known dimensions, then inputting a distance or placing an object at a known distance may not be necessary. Nevertheless, in some embodiments, the device 100 may be configured to request a confirmation that an object or a location on the playing surface, such as a baseline corner or a service box corner, is correctly identified by the device 100. After a confirmation by the user or, as described above, a manual input of some information by the user, the device 100 may be configured to autonomously complete the calibration procedure and continue to a state where it is ready for trajectory capture. In some embodiments, the calibration procedure may be completely autonomous and a confirmation by the user or manual input by the user may not be utilized.

The analysis and feedback device 100 may include or may be coupled to a device that provides an interface for inputting for parameters, such as type of racquet, type of ball, age of ball and ambient conditions, such as the weather. Using racquet information, the system may be operable to determine a location where a ball hits the racquet and compare it with a known "sweet spot" for the racquet.

The analysis and feedback device may be operable to output data in a number of formats that enhance a training experience in conjunction with the device and/or that provide entertainment value. For instance, the measured parameter(s) may be compiled into score(s), allowing the player to track and share improvement in score. As another example, the scores may be shared in a real time or delayed fashion over a medium such as the Internet or a cellular network, in a manner that allows the players to compete with each other. Further, the scores or information output from the device may allow observation and scoring to be provided to the player(s) or audience(s) for purposes of entertainment, payment, and/or teaching.

The analysis and feedback device may be operable to measure trajectory parameter at numerous locations along a trajectory, such as from toss, to impact, to landing and bounce as shown in FIG. 1 for a server. For example, the device may be able to measure the resulting location where the serve first landed 110d, such as in the opposite court. This location may be recorded simply as serve in or serve out, which may also be provided as feedback to the player. Further, the location could also designate the exact point that the serve hit the court or whether the serve hit a designated target space within the service box. It may or may not be necessary to add additional cameras to the device to achieve this measurement of resulting serve location. In one implementation, a second set of stereo cameras would be added to the device to view the court on the other side of the net from the server.

Additional details of an implementation of analysis and feedback device and/or system for tennis is described as follows for the purposes of explanation and is not meant to be limiting. FIG. 2 is a perspective view illustrating a use of a trajectory detection and analysis system for tennis. In FIG. 2, device 100 may be a custom tennis racquet bag containing a stereo camera consisting of top camera 124a and bottom camera 124b. The bag may also contain the logic device that receives the frames, generates the trajectory information and generates a wireless signal via wireless interface 100a with initial ball impact height, initial ball speed and initial ball angle. Wireless signal may be received by a wearable device 122, which may display feedback information, such as serve type, ball impact height, ball initial speed and ball initial angle (see FIG. 3 for more detail). The device may also be operable to output this information in an audio format. In some embodiments, the wearable device may also be used as an input device.

In particular embodiments, the wearable device may store information regarding a series of shots that can later be downloaded to a computer and can be uploaded onto the Internet, if desired. Thus, the device may include a memory unit, such as flash memory or a small hard-drive. In some embodiments, the device may include sensors, such as a 3-axis accelerometer and/or tilt/rotation sensors and/or GPS receiver that allow a position of the watch to be tracked. This information may be transmitted to the analysis and feedback device 100. In one embodiment, the watch may include a band or other surface that is coated with a material that allows it to be more easily tracked and discerned by cameras 124a and 124b.

The tennis racquet 108 and tennis ball 128 may be unmodified. Although, the changing angle and speed of the racquet may be useful to determining the spin, speed and direction imparted to the ball. To simplify capturing the angle and speed of the racquet, could put special marking on the head of the racquet or the strings of the racquet in order to simplify capture and computation of this information. For example, stickers, with shapes or markings of a known size and pattern, or a special marking pen may be utilized that allow the system to more easily pick out the racquet in a series of video frames.

In one example, the custom tennis racquet bag 100 may be placed on the chain link fence 120 or other object in a position approximately head high and in line with the baseline extended 129. In other embodiments, the bag 100 may include an interface that allows it be coupled to a tripod. In yet another embodiment, the bag may include telescoping legs that may be configured to extend from the bag 100 for use and then to retract into the bag for stowage.

The player 116a may select the service type to be attempted using the wearable device 122. The player may stand at the baseline in service position and hold the ball 122 in front of their body in the normal start position before the service toss. Both cameras may identify the ball allowing the logic device to calculate the distance from the bag to the ball. When the ball is identified, an LED light on the bag 100 may change from red to green signifying the device is ready for the player to hit the serve or another output device, such as an audio device may be used to indicate the device status. For instance, a speaker coupled to the bag. When the player serves, the cameras may track the trajectory of the ball during the toss, at impact point, and during the first 20 feet of the flight after racquet impact or at other points along the trajectory.

In particular embodiments, the device 100 may be operable to identify one or more objects associated with a tennis court, such as court markings and a net. Further, the device 100 may be operable to determine a relative position of one or more of a player or parts of a player to the one or more objects, such as a player's foot relative to baseline. In addition, the device 100 may be operable to determine a relative position of a tennis ball to the one or more objects, such as whether a tennis ball impacts on one side or another side of one of the court markings.

In one example, with cameras operating at 200 frames/second, a 70 mile per hour serve would be captured by each camera in 38 frames during the first 20 feet of flight:

$$20 \text{ ft}/170 \text{ ml/hr} \times 1 \text{ mile}/5280 \text{ ft} \times 60 \text{ min}/1 \text{ hr} \times 60 \text{ sec}/1 \text{ min} \times 200 \text{ fr}/1 \text{ sec} = 38.8 \text{ frames}$$

Of course, this calculation will vary depending on such factors as the camera being used, the player's physical attributes, the type of shot, etc. and is not meant to be limiting. Using a single camera, the impact height, initial serve speed and initial serve direction may be calculated in 2-dimensions. Further, using a stereo camera the analysis and feedback device may calculate true speed and direction in 3-dimensions correcting for the amount the serve direction deviates from parallel to the device. The stereo camera may improve ball detection by the vision system by separating the ball from the clutter of colors and patterns in the background. The device 100 may include an additional camera 124c for further tracking of the ball 108 along its trajectory.

In particular embodiments, the device 100 may be operable to track one or more of a series of shots after the serve or a series of shots in general. For instance, player 116a may be serving to a wall 126 or to another player (not shown). Player 116a (a refers to time a and position a) may hit the serve, which may return along trajectory 127 where 128b is the tennis ball along this trajectory. The player 116b (b refers to time b and position b). The player could then hit the ball against the wall or to another person, which could also be returned. The device 100 may be operable to record each of these shots and provide feedback information, which may vary or may be the same for each shot.

In yet another embodiment, training for ground strokes and volleys may be accomplished with the use of a ball machine that provides the ball to the training player in a consistent manner. The system could provide an analysis on a series of strokes generated by the player using such a device. The feedback device may be operable to record initial trajectory parameters for the tennis ball leaving the device to factor in any inconsistencies that are due to the ball machine as opposed to the player. An instructor hitting shots to a player may also generate a series of shots that may be recorded although an instructor may not be as consistent as a ball machine.

Figure 3:
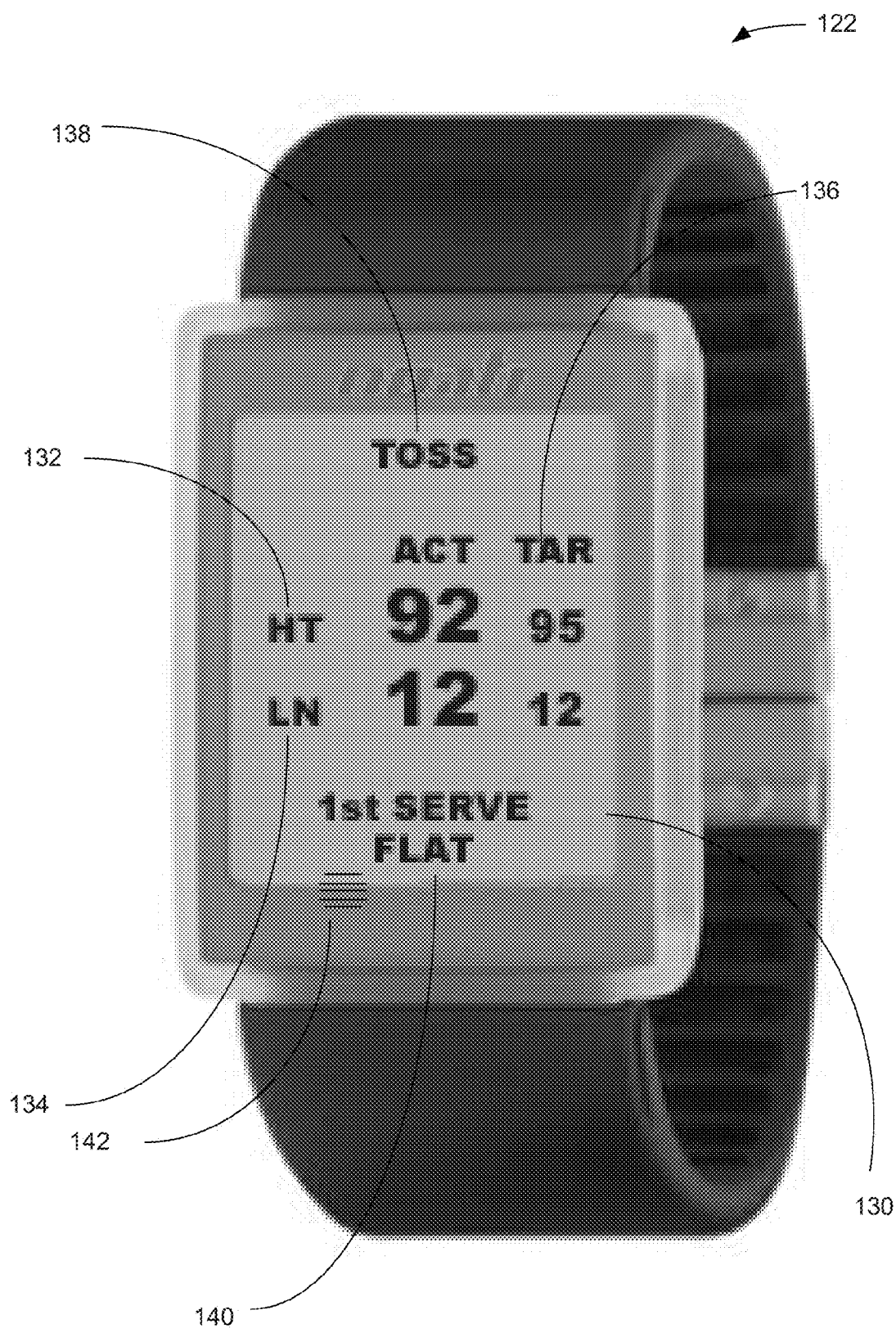
FIG. 3 is an example of a wearable feedback interface for a trajectory detection and analysis system for tennis.

FIG. 3 is an example of a wearable feedback interface for a trajectory detection and analysis system for tennis. In one embodiment, provided for illustrated purposes only, the wearable feedback device may include a "watch-like" form factor including an audio output interface 142 and a display interface 130. The display 130 could appear as shown where "1st serve flat," 140, identifies the service type, "ht," 132, refers to height at the top of the toss parabola above the court surface in inches, "ln," 134, refers to lean (the distance the ball is in front of the baseline at the top of the toss parabola), "act" refers to actual parameters that have just been measured for that serve (i.e., 92 inches and lean of 12, "tar," 136, refers to target parameters for this particular player and the type of serve that the player is trying to reproduce to build strong muscle memory.

In one implementation, the wearable device 122 may be operable to store environment, trajectory and racquet data which can be uploaded to a computer or other device connected to a network, such as the Internet. The wearable device may also be operable to store video data, associated feedback information, analysis associated with a training session, such as consistency information. The wearable may also be operable to measure and store conditions associated with a training session, such as a player's heart and/or ambient temperature and humidity. Further, the device may be operable to communicate with an audio device, such as an ear-bud worn by the player using a protocol, such as Bluetooth™.

Figure 4:
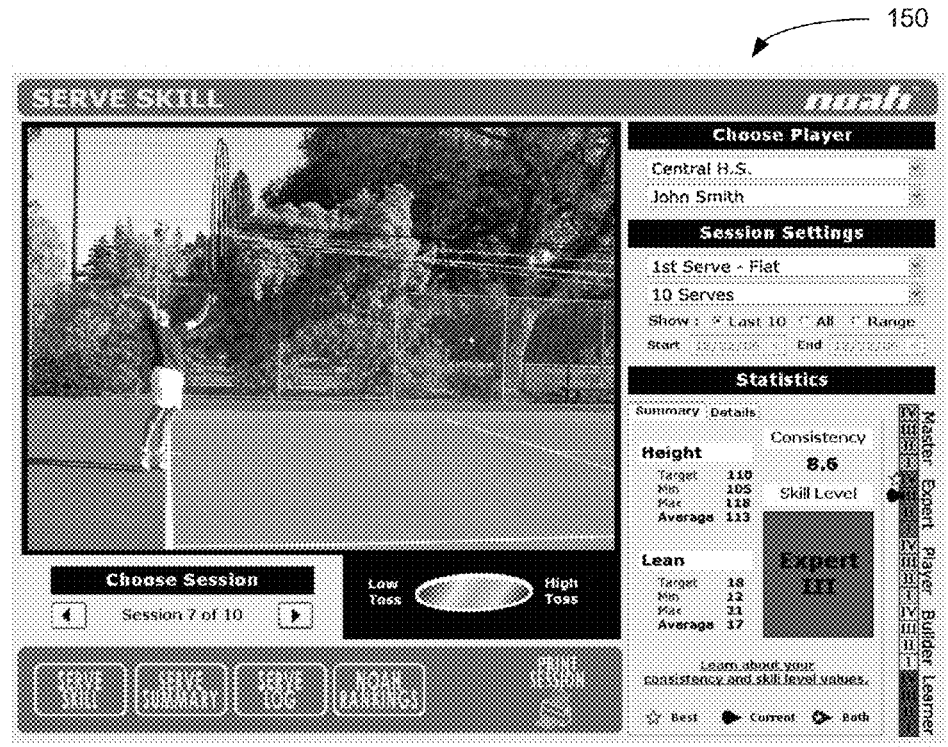
FIGS. 4 and 5 are examples of interface screens for a trajectory detection and analysis system for tennis.
Figure 5:

FIGS. 4 and 5 are examples of interface screens for a trajectory detection and analysis system for tennis. A display interface could appear as shown (In some embodiments, this display interface may be provided with the analysis and feedback device for immediate viewing or via another device, such as computer connected to the Internet for later viewing). On the interface screen, 150, "serve skill" may refer to the analysis done on the data and being presented. Further, the large frame in the screen includes the trajectory of the last 10 serves color-coded for toss height, a photo of player is in the background. "Serve Summary", "Serve Log" and "Noah Rankings" are examples of other analyses/displays available that may be selected by a user.

"Print Session" allows display page to be printed (or saved) to a file. "1st serve—flat" identifies the serve type. "10 serves" identifies the number of serves analyzed. Of course, as noted above, any type of stroke associated with the play of a game of tennis may be recorded and analyzed.

In FIG. 4, "Target" may identify the personalized parameters the tennis player is trying to achieve. "Min", "Max", "Average" may display the minimum, maximum and average measurements for the 10 serves. Scale on the right hand side may identifies the skill of the player's ability to reproduce the same results with every serve, i.e., a measure of consistency. Formula may be based upon a weighted average of the standard deviation of results. "Expert III" may display the current skill level for these 10 serves as displayed on the scale.

In another example, as shown in FIG. 5, for the purposes of illustration only, the display interface 160 may appear as follows. "Attribute", "Serve Type", "Country", "State", "Time Period", "Gender" and "Age" may be selected from pull down menus where "ID" is a self-identified name for use on the system. "Speed" is an example of one trajectory parameter, in this case normalized, calculated serve speed for the ranking report in the identified categories.

As mentioned above, the feedback and analysis device may be used for training and entertainment purposes. On the court, a watch or other real time display may provide a communication link among two or more tennis players in one or more locations in real time competition connected through the Internet, cellular network or other medium while playing set games. Examples of real time games using unmodified racquets and balls may include but are not limited to:

Highest percent of 25 flat serves placed into a 2 ft×2 ft square at the back-left corner of the service box.

Highest percent of 25 kick serves placed into a 2 ft×2 ft square at the back-center corner of the service box.

Fastest flat serve out of 25 serves.

Highest consistency skill for 25 second slice serves. Device would display the skill level of all players when all have completed their 25 serve session.

Around the world game. Players need to serve into 6 designated spots on the court with a minimum of tries. Additionally, players who hit a designated spot could get an additional try in the same turn.

In one embodiment, the trajectory information may be used to create an interactive tennis game that can be played over the internet using a racquet with know parameters (weight, string taughtness, etc.) and a court with known parameters (hard, grass, clay) and maybe even a person with known skill level (as the opponent or doubles partner). Game may have similarities to current video tennis offerings, but would use real tennis racquets with full, realistic swings and maybe even a real ball (for at least the serve hit into a net).

Figure 6:
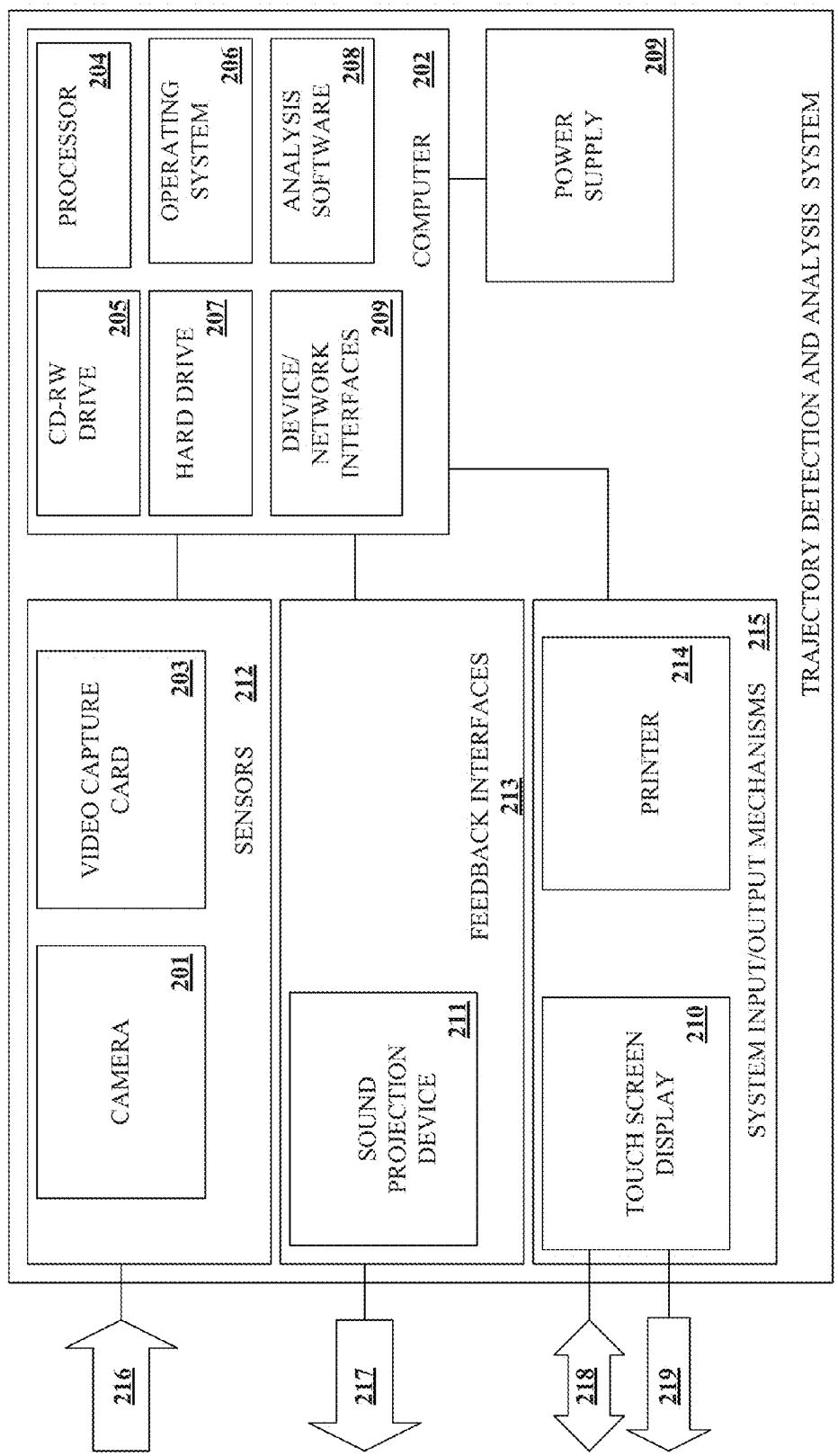
FIG. 6 is a block diagram illustrating exemplary components of a trajectory detection and analysis system.
Figures 7A, 7B, 7C:
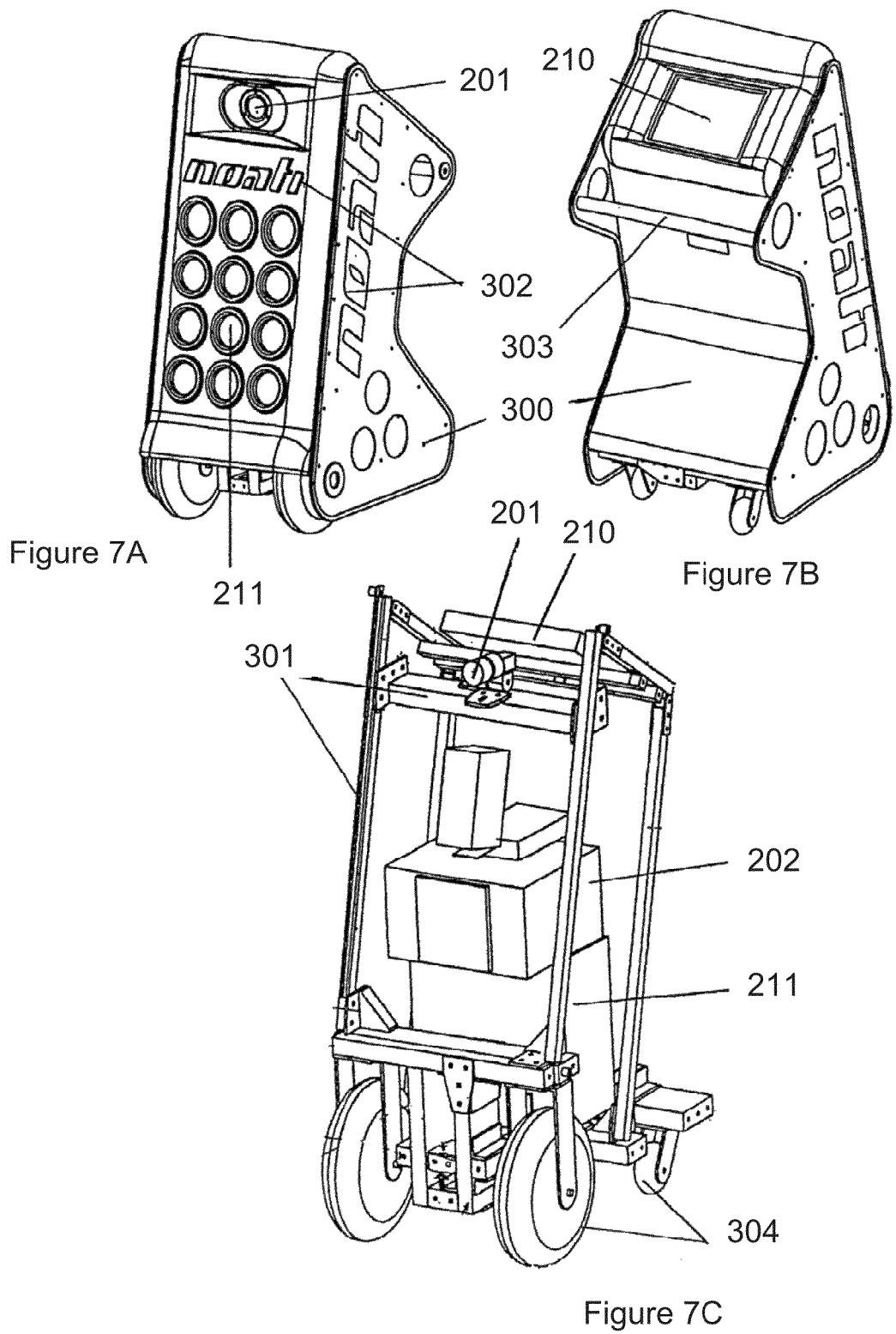
FIGS. 7A-7C are perspective drawings illustrating exemplary components of a trajectory detection and analysis system.

FIG. 6 is a block diagram of a trajectory detection and analysis system 100 of the present invention. The components of the system 100 may be enclosed within a single housing or may be divided between a plurality of different housings enclosing different components of the system. Further, the system 100 may include different components that are not shown, such as the peripheral devices and remote servers.

Physical information 216 is input into the system 100 via sensors 212. In one embodiment, a machine vision system may be used where the machine vision system comprises one or more cameras 201 (e.g., a CCD camera) and a video capture card 203 for digitizing captured frame data. The video capture card 203 may capture color pixel data. The camera 201 may employ a 3.5-8 mm zoom lens and may allow for different lens attachments. In another embodiment, the system may employ a plurality of cameras arranged on a mechanism that allows different type cameras to be rotated or moved into place where only one camera is used at a time to record frame data. The different cameras may allow the detection volume of the system to be adjusted.

The digitized frame data from a machine vision system and other sensor data may be processed by a computer 202. The computer 202 may be a modified PC using a 1.6 GHz processor 204 w/RAM and a CD-RW drive 205 for inputting and outputting data and software. The computer 202 may also include a mass storage device, such as hard drive 207 and various network/device communication interfaces, such as wireless and wired network interfaces, for connecting to a local area network (LAN), wide-area network (WAN) or the Internet. The device communication interfaces may allow the computer to communicate with a plurality of peripheral devices and other remote system components.

The computer 202 may include operating system software 206 for controlling system resources, such as feedback interfaces 213 and the system input/output mechanisms 215. The computer 202 may be used to execute analysis software 208 for analyzing trajectories using the sensor data from sensors 212 and for generating feedback information 217. The analysis software 208 may include software for providing various services, such as 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters, 5) prescribing actions for improving performance and 6) performing video editing tasks. The computer 202 may also be used to execute database software for relating physical information 216 and other information generated by the computer 202 to player identification information (e.g., name, age, address, team, school, etc.) and session identification information (e.g., time, data, location, number of trajectories analyzed, types of shots, etc.).

Power to the computer 202 and other devices may be provided from the power supply 209. In one embodiment, the power supply 209 may be a re-chargeable battery or a fuel cell. The power supply 209 may include one or more power interfaces for receiving power from an external source, such as an AC outlet, and conditioning the power for use by the various system components. In one embodiment, for in-door/outdoor models, the system 100 may include photocells that are used to provide direct power and charge an internal battery.

Feedback information 217, used by clients of the system 100 to improve their trajectory skills, may be output through one or more feedback interface devices 213, such as a sound projection device 211. In general, the system may be capable of outputting feedback information 217 to a plurality of different devices simultaneously in a plurality of different formats, such as visual formats, auditory formats and kinetic formats.

The system 100 may support a plurality of different input/output mechanisms 215 that are used to input/display operational information 218 for the system 100. The operational information 218 may include calibration and configuration setting inputs for the system and system components. In one embodiment, a touch screen display 210 may be used to input and display operational information 218 using a plurality menus. Menus may be available for configuring and setting up the system 100, for allowing a player to sign into the system and to select preferred setting for the system 100 and for viewing session information 219 in various formats that have been generated by the system. The printer 214 may be used to output hard copies of the session information 219 for a player or other client of the system 100. The present invention is not limited to a touch screen display as an interface for operational information. Other input mechanisms, such as but not limited, a key board, a mouse, a touch pad, a joystick and a microphone w/voice recognition software may be used to input operation information 218 into the system.

FIGS. 6A-6C are perspective drawings of exemplary components of a trajectory detection and analysis system. These figures, as well as FIGS. 5 and 7, are provided to illustrate types of components in a trajectory system and not mean to limit various form factors, combinations and/or configurations of these components. For instance, the locations, sizes and form factors of these components could look substantially different if they were integrated into a bag, as described with respect to FIG. 2. Further, every component of the system need not be included in every embodiment. For instance, the sound output device 211 may be eliminated in some designs or made substantially smaller, which could alter the form factor of the design.

In FIGS. 6A-6C, a camera 201 used in a machine vision system, a touch screen display 210, a computer 202 and a sound projection device 211 are integrated into a housing 300 with a support chassis 301. The system 100 may also include an amplifier for the speaker 211 (not shown). Further, the system 100 may include sensors for measuring ambient conditions, such as temperature, humidity and wind speed or at least include an interface for inputting information related to these environmental factors.

Wheels 304 are attached to the chassis 301 to allow the system 100 to be easily moved and positioned for use. In general, the chassis of devices of the present invention may be designed with a weight and a form factor, which may facilitate transport, storage and unobtrusive set-up, calibration and operation of the device. For instance, the device includes a handle 303 attached to panels 300 comprising the housing that may be used to move the device and which may aid in set-up and storage of the device.

The speaker 211 takes up a large portion of the internal volume of the system. In one embodiment, a travel system may be used that incorporates a portable computer system such as laptop that is connected to a machine vision system with the camera 201. To use the travel system, it may be placed on top of a support platform, such as a tripod, a table or a chair. The travel system may provide feedback information via a wireless communication interface to audio device, such as an "earbud," worn by the player or wearable feed back device described with respect to FIG. 3. In another embodiment, the travel system may generate output signals that may be routed through a portable audio system (e.g., a boom box) for amplification via speakers on the audio system to provide feedback information.

Figure 8:
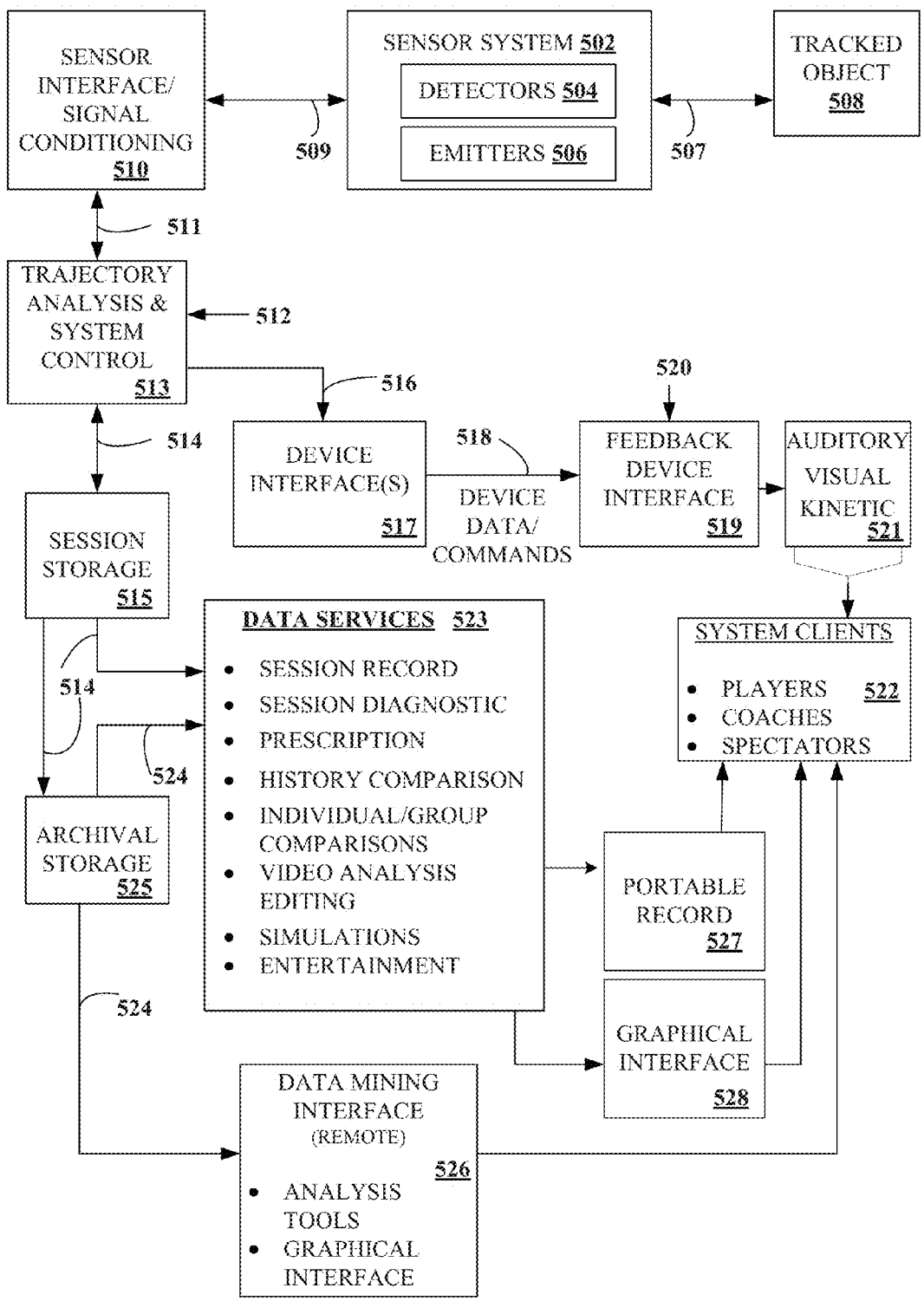
FIG. 8 is an information flow diagram for exemplary components of a trajectory detection and analysis system.

FIG. 8 is an information flow diagram for a trajectory detection and analysis system of the present invention. A sensor system 502, which may comprise emitters 506 and detectors 506, receives physical information 507. The physical information 507 may be energy signals reflected from a tracked object 508, such as a tennis ball. In the case where sensors are mounted to the tracked object 508, then the physical information 507 may be sent as signals from the sensors to a detector 504. Typically, the physical information 508 is transmitted through a medium such as air.

The sensor system 502 may convert the physical information 507 to sensor data signals 509. For instance, a charge coupling device generates electronic signals in response to photons striking a sensor array. The sensor data signals 509 may be sent through a wired or wireless connection to a sensor interface 510, which provides signal conditioning. The signal conditioning may be needed to allow the sensor data 509 to be processed. For instance, prior to analysis, a video capture card may digitize video frame data.

In 513, the conditioned signals 511 may be processed according to system control software and according to trajectory analysis software 513 using set-up and control inputs 512 that have been input into the system. The system control software 513 may analyze portions of the data 511 to determine whether the sensor system 502 is operating properly. Based-upon the analysis of the data 511, the system control software may provide calibration instructions and other operational instructions to the sensor system which may be transmitted to the sensors via the sensor interface 510.

The trajectory analysis software 513 may be used to process the conditioned signals 511 and generate trajectory parameters. The trajectory parameters may be used to generate feedback information. The feedback information may be one or more trajectory parameters or a combination of trajectory parameters, such as a ratio of trajectory parameters or a product of trajectory parameters that may be useful to a system client in improving their trajectory skills.

Depending such factors as the application (trajectory of a specific type of object), the set-up and components of the system, the environment in which the system is used and what portion of the trajectory of an object the device is used to measure, the present invention may provide feedback to the player nearly immediately, within a second or within 10 seconds as measured from some time state along the trajectory that has been analyzed by the system. For instance, when information on the beginning of the trajectory is directly generated by the system, then the time to provide feedback may be measured from the time when the trajectory is initiated and then first detected by the system. When information on the end of the trajectory is directly measured, then the time to provide feedback may measure from the time to when the trajectory has neared completion and has been detected by the system.

The feedback information may be sent as feedback information parameters 516 to one or more device interfaces 517. The device interfaces 517 may communicate with a plurality of feedback devices. The device interfaces 517, which may include device drivers, may transmit device data/commands 518 to a feedback device interface 519 located on each feedback device. The device data/commands 518 may be used to control the operation of the feedback devices. The output from the feedback device may also be modified using set-up/control inputs 520 that may vary for each device.

The feedback devices may output the feedback information parameters 516 received as device data 518 in one of an audio, visual or kinetic format 521 depending on the capabilities of the feedback device. For example, the device interface 517 may send device data/commands 518 to a display that allows a numeric value of a feedback information parameter 516 to be viewed on the display by one of the system clients 522, such as players, coaches and spectators. As another example, a device interface 517 may send device data/commands 518 to an audio output device that allows feedback information parameters 516 to be output in an audio format to one or more of the system clients 522.

The feedback parameters 516 generated from the trajectory analysis software 513 and other raw data generated from the sensor system 502 may be sent to session storage 515. The session storage 515 may accumulate trajectory data from a plurality of trajectories generated during a trajectory session for one or more players. All of a portion of the trajectory data 514 may be sent to archival storage 525 when the session has been completed. For example, only a portion of the raw data, such as video frame data, may be sent to archival storage. Further, the data may be filtered for bad data prior to being sent to archival storage 525. The archival storage 525 may include a database used to relate trajectory data from one or more trajectory sessions to the conditions of the trajectory session, such as time place and location, and player identification information.

The archival data 524 and session data 514 may be used to provide one or more services 523 including but not limited to 1) a session record of trajectory parameters (see FIG. 7), 2) session diagnostics, 3) prescription for improvement, 4) a history comparison of trajectory data from different sessions, 5) individual/group comparisons of trajectory session data, 6) video analysis and editing tools, 7) simulations (e.g., predicting a player's driving distance improvement based upon changing one or more of their swing parameters and 8) entertainment. As an example of entertainment, a player's trajectory average trajectory parameters and variability may be used in trajectory simulations for a video tennis game or another game where the parameters have been measured. Two players that have used the system 100 may both enter their parameters and compete against one another in the video game. The player may also use the game to see how they match up against professional or other athletes who have had their trajectory parameters defined.

Output from the data services 523 may be converted to a portable record 527, such as print-out from a printer, or may be formatted for viewing on a graphical interface 528. The graphical interface may also include a storage capacity allowing data to be viewed at a later time. The output from the data services 523, such as a portable record 527 or information viewed on the graphical interface 528, may be used by the system clients 522. The data services 523 may also be provided via a data mining interface 526. The data mining interface 526 may include analysis tools and a graphical interface. When the archival storage is remotely accessible, it may be used to access archived data 524 via a remote connection, such as from the Internet.

Information passed between the different components in the system as described with respect to FIG. 6 may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Calculating Tennis Stroke Dynamics

The trajectory (flight) of a tennis ball may be predicted based on an understanding of the dynamics of the racquet motion and the interaction of the racquet face (strings) with the ball when contact occurs. Depending on the type of shot (serve, ground stroke, volley, overhead), different parameters are important in measuring performance.

The serve involves the most complex combination of movements of the player, racquet, and ball. All of these are important in producing the serve. The first part of the ball's motion is the toss. From the instant the ball is released from the server's hand, the trajectory of the ball is primarily affected by gravity. A secondary, but potentially important, effect is the action of wind on the ball while it is on its way up or down. The trajectory of the ball may be observed directly by the vision system, or it can be calculated based on the initial conditions (position and velocity) at the instant the ball is released from the server's hand. Accounting for the effects of wind on the trajectory of the toss requires the wind speed and direction to be known a priori and provided as an input to the calculation.

While the ball is in motion from the toss, the server swings the racquet overhead to strike the ball near the apex of its trajectory. Several parameters are important at the instant of contact: racquet head speed and direction, orientation of the racquet head, location of the ball at time of impact (height, longitudinal, and lateral positions), and ball speed. It may also be important to account for the properties of the ball (size, pressure, felt), racquet (frame stiffness, string type and tension), and environment (temperature, air density, humidity).

The interaction of the racquet face and the ball produces the motion of the ball. The ball motion at the instant it loses contact with the racquet face may be fully described by its position (x,y,z), velocity (Vx, Vy, Vz), and spin (Wx, Wy, Wz). This initial condition may be predicted by modeling the interaction of the racquet strings and ball, or measured by direct observation of the ball using the vision system (The vision system may comprise cameras or other measuring devices, associated software and processors used to determine a trajectory of an object, such as tennis ball).

The speed of the racquet approaching the ball may be decomposed into a component normal to the racquet face and two components tangential to it. The normal component of the speed determines the speed and direction of the ball, while the tangential components determine the spin (topspin/underspin and side spin). The speed of the ball leaving the racquet depends on the efficiency of momentum transfer from the racquet to the ball. This, in turn, depends on the elasticity of the strings and the ball. If the collision is perfectly elastic and the racquet is much more massive than the ball, then the speed of the ball as it leaves the racquet will be twice the normal speed of the racquet face. If this approximation is not valid, it may be possible to calibrate the momentum transfer efficiency by using the vision system to observe a number of racquet strokes under a variety of conditions (such as speed and spin) and "learn" the characteristics of a particular racquet and ball pair.

The spin imparted to the ball by the racquet is the result of torque applied to the ball by the tangential speed of the racquet face. The ball will acquire angular velocity about the vertical axis (side spin) and lateral axis (top spin) that are important in predicting the subsequent trajectory of the ball. As a first approximation, it can be assumed that the ball acquires all of the tangential velocity of the racquet. If this approximation is not valid, it may be possible to calibrate a racquet/ball pairing by direct observation as described in the preceding paragraph.

Once the initial motion of the ball is known—position, velocity, and spin vectors—the trajectory of the ball may be calculated from its dynamics of flight and used to provide a player feedback information in real-time. The variation of the aerodynamic properties (lift, drag, and side force) with the ball's velocity and spin is a potentially significant effect that may be included as needed to achieve the desired level of accuracy in the performance parameters of interest.

An example of one methodology for calculating the trajectory of a tennis ball is provided below for the purposes of illustration only. More or less complex simulations may be used and this example is not meant to be a limiting description of analysis and feedback devices described herein. The equations of motion shown represent a system of coupled nonlinear ordinary differential equations; as such, no analytical, closed-form solution exists. With the computing power readily available in today's low-cost personal computers, one practical approach to solving these equations is to apply a numerical integration scheme. For example, it is possible to perform an explicit time integration scheme using a small time increment, $\Delta t$, to advance the solution until the desired results are obtained. This example is provided for illustrative purposes only, as many other types of numerical schemes may be employed with devices of the present disclosure.

Using a spreadsheet computation, a numerical integration may be performed to generate a database of the trajectory. The database may contain the relevant variables at each time step—acceleration, velocity position, flight angle, etc. A database query may then performed to extract the parameters of interest, such as, but not limited to, flight distance, maximum height, final speed, angle, etc.

Equations of Motion:

The motion of a tennis ball in flight may be described by the following equations.

$$\ddot{x} = -\frac{\rho s}{2m}[(\dot{x}+w_x)^2 + \dot{y}^2 + (\dot{z}+w_z)^2][C_D\cos\alpha\cos\beta + C_L\sin\alpha\cos\beta]$$

$$\ddot{y} = \frac{\rho s}{2m}[(\dot{x}+w_x)^2 + \dot{y}^2 + (\dot{z}+w_z)^2][C_L\cos\alpha\cos\beta - C_D\sin\alpha\cos\beta] - g$$

$$\ddot{z} = -\frac{\rho s}{2m}[(\dot{x}+w_x)^2 + \dot{y}^2 + (\dot{z}+w_z)^2][C_D\sin\beta + C_N\cos\alpha]$$

where the variables are defined as,
$\ddot{x}, \ddot{y}, \ddot{z}$ Acceleration components in x, y, z direction
$\dot{x}, \dot{y}, \dot{z}$ Velocity components in x, y, z, direction
x Direction toward net
y Vertical
z To the right when facing net
$\rho$ Air density
s Cross-sectional area of ball
m Mass of ball
$w_x$, $w_z$ Wind velocity components
$C_D$ Drag coefficient
$C_L$ Lift coefficient
$C_N$ Side force coefficient
$\alpha$ Angle of flight above horizontal
$\beta$ Angle of flight to right of target
g Gravitational acceleration The inputs to the trajectory computation may be initial ball speed and flight angle and wind speed. The ball speed, flight angle, and spin may be deduced from the racquet speed and orientation. The analysis and feedback devices described herein may be used to acquire these initial conditions.

For example, using a camera based system, capturing the position of the ball 5 or more times within the first 0.1 seconds of flight, or within the first 1 meter of flight, alternatively, allows the initial conditions for trajectory computation of a tennis ball to be determined. The calculations are fast enough to allow immediate feedback to be provided to a user. For instance, the calculation described above may be performed in less than 1 second. Of course, this calculation time may very depending on the performance of the computer hardware employed and the numerical integration scheme used.

An example calculation is provided as follows.

Sample Trajectory Calculation

| | | | |
|---|---|---|---|
| Racquet orientation, deg. | 0 | Initial horizontal velocity, m/s | 40.0 |
| Initial speed, m/s | 40 | | |
| Headwind, m/s | 0 | Initial vertical velocity, m/s | 0.0 |
| Initial flight angle, deg. | 0 | Flight distance, m | 25.0 |
| Initial spin, rpm | 0 | Max height, m | 9.0 |
| Time step, sec | .01 | Final speed, m/s | 21.8 |
| Air density, kg/m^3 | 1.225 | Final angle, deg. | −17.2 |
| $\pi$ | 3.141593 | Final horizontal velocity, m/s | 20.8 |
| Ball radius, m | .033 | | |
| Drag area, $\pi$*R$^2$, m$^2$ | 0.001327 | Final vertical velocity, m/s | −6.5 |
| Ball mass, kg | 0.05 | | |
| $C_D$ | 0.63 | | |
| $C_L$ | 0.0 | | |
| Initial inclination, rad | 0.174533 | | |
| Initial x-velocity, m/s | 40.0 | | |
| initial y-velocity, m/s | 0.0 | | |
| Gravitational acceleration, m/s | 9.8 | | |

The calculated trajectory (not shown) provides x and y distances where y is a height above the ground as a function of time. The table above lists some constants used in the calculation and some results from the calculation.

In the example above, as previously described, in one embodiment the initial conditions may be derived from data captured using an analysis and feedback device. In another embodiment, the device may store a database of racquet and ball properties. Thus, the player may simply enter the racquet and ball descriptors (e.g., string type and tension, brand and age of ball), and the device may be operable to look up the appropriate data. In other embodiments, the device may have some wind measuring capabilities as well as other capabilities for determining ambient conditions that may affect a trajectory, such as temperature, humidity and air density (which may vary with altitude as well).

The analysis and feedback device may store the calculated trajectory results and the trajectory shown above may be displayed to the player. Also, as previously, feedback information, derived from the trajectory may be output to the player. As another example, a trajectory of the ball may be output in a 3-D format including, but not limited to, one or more of simulated flight paths in 3-D and a ground track of the ball. Many different aspects of the trajectory may be output and these are provided for illustrated purposes only.

The trajectory for strokes other than the serve—ground strokes, volleys, and overheads—can be predicted using the same techniques described above. The only difference is that in the case of strokes other than the serve, the ball is approaching the player's racquet with significant velocity and spin. It is necessary to initialize the computation of the stroke with the velocity and spin of the ball, which maybe measured by the vision system by direct observation.

Another potentially useful aspect of the tennis ball's trajectory to understand is its bounce dynamics. Depending on the speed, angle, and spin the ball possesses as it contacts the court surface, and the physical properties of the ball and court, the bounce exhibits significant variation. This is an important strategic aspect of the competitive game of tennis, and players expend considerable effort understanding and controlling the bounce. A kick serve, for example, produces a bounce that sends the ball in a significantly different direction than it was traveling immediately before the bounce, resulting in a particularly difficult shot for the opponent to return. A flat ground stroke results in a shallow bounce angle, keeping the ball low after the bounce and therefore difficult to return with power. Grass courts produce skidding bounces that don't take as much speed off the ball as hard courts, resulting in more challenging conditions for the return shot. This encourages grass court competitors to volley the ball more often, so that they do not have to deal with a difficult bounce. In contrast, clay courts and some hard courts slow the ball significantly, and the bounce responds more strongly to spin, favoring a style of play that utilizes a variety of spins to be imparted on the ball.

Because the path of the ball after the bounce is so important to the competitive game, providing feedback about the bounce in training sessions may be valuable. This can be done by direct observation using the vision system, or it can be predicted from the trajectory and an understanding of the bounce characteristics. Using the trajectory prediction method described above, the location, speed, and spin of the ball when it contacts the court surface can be predicted. Then, a model of the bounce dynamics can be used to calculate the change in velocity resulting from contact with the court. This will produce a new initial condition for the ball (location, velocity, and spin) that can be used to continue the trajectory prediction as the ball continues into the opponent's court. The speed of the ball, height of the bounce, and resultant spin after the bounce are examples of parameters useful in assessing a player's performance on a particular shot.

Integrated System for Indoor and Outdoor Video Games Including Sports Skill Development Many individuals engage in sports focused video games in an indoor environment involving a gaming console. Currently, there is little relationship between the skills developed to play the indoor video and the actual skills used to play the sport portrayed in the video game. In view of the above, new systems and methods are desired that integrate indoor sports video gaming with corresponding outdoor sporting activities involving actual engagement in the sport portrayed in the video game.

In this section, some aspects of an integrated system for sports skill development are described. The system can include an indoor video game component that provides both an entertainment component and a training component related to the development of skills used to improve performance in actual play of the sport. The system can include a measurement and analysis component used to characterize a user's skills playing the sport. The video game component can be configured to receive information obtained from the measurement and analysis component such that a user's video game performance can be related to how the user actually plays the game. A few details of such a system are described below with respect to tennis. However, the system is applicable to other sports.

As described in the previous paragraph, the system can integrate modes of operation involving actual and virtual play of a tennis game. In the operational mode involving virtual simulations, one or more various sensory aspects of a tennis game can be generated. For example, a virtual visual representation of a tennis ball, which is to be hit and court markings, can be projected into a participant's eye using a worn device, such as Google Glass™ or can be output to a video display visible to the participant. In another example, the feeling of a ball being hit by a tennis racquet can be simulated and transmitted to a participant's hand via an electronic device held by the participant. The feeling can be generated in response to the participant swinging the electronic device at the virtual visual representation of the tennis ball.

In an operation mode involving actual play of the game, the system can be configured to capture data which can be used in a simulation. For example, a sound of a participant hitting a tennis ball can be recorded and then subsequently played back during a simulation where the person swings at a virtual ball generated as part of a simulation. As another example, video images of a tennis ball hit towards a participant or moving away from the participant can be recorded using an image capture device worn by the participant where information derived from the images, can be used in a simulation of a virtual tennis ball being hit towards the participant.

Additional details of the integrated system are described in following paragraphs. The embodiments of the integrated system can be utilized alone or in combination with the apparatus and methods described above with respect to FIGS. 1-8. In one embodiment, video games can be provided with the integrated system. Additional details of methods and apparatus involving a video gaming system which can be utilized herein are described in U.S. patent application Ser. No. 13/780,970, filed Feb. 28, 2013, by Marty et al., titled "Methods and Apparatus for Video Gaming Simulations Using Motion Capture," which is incorporated in its entirety and for all purposes.

Figure 9:
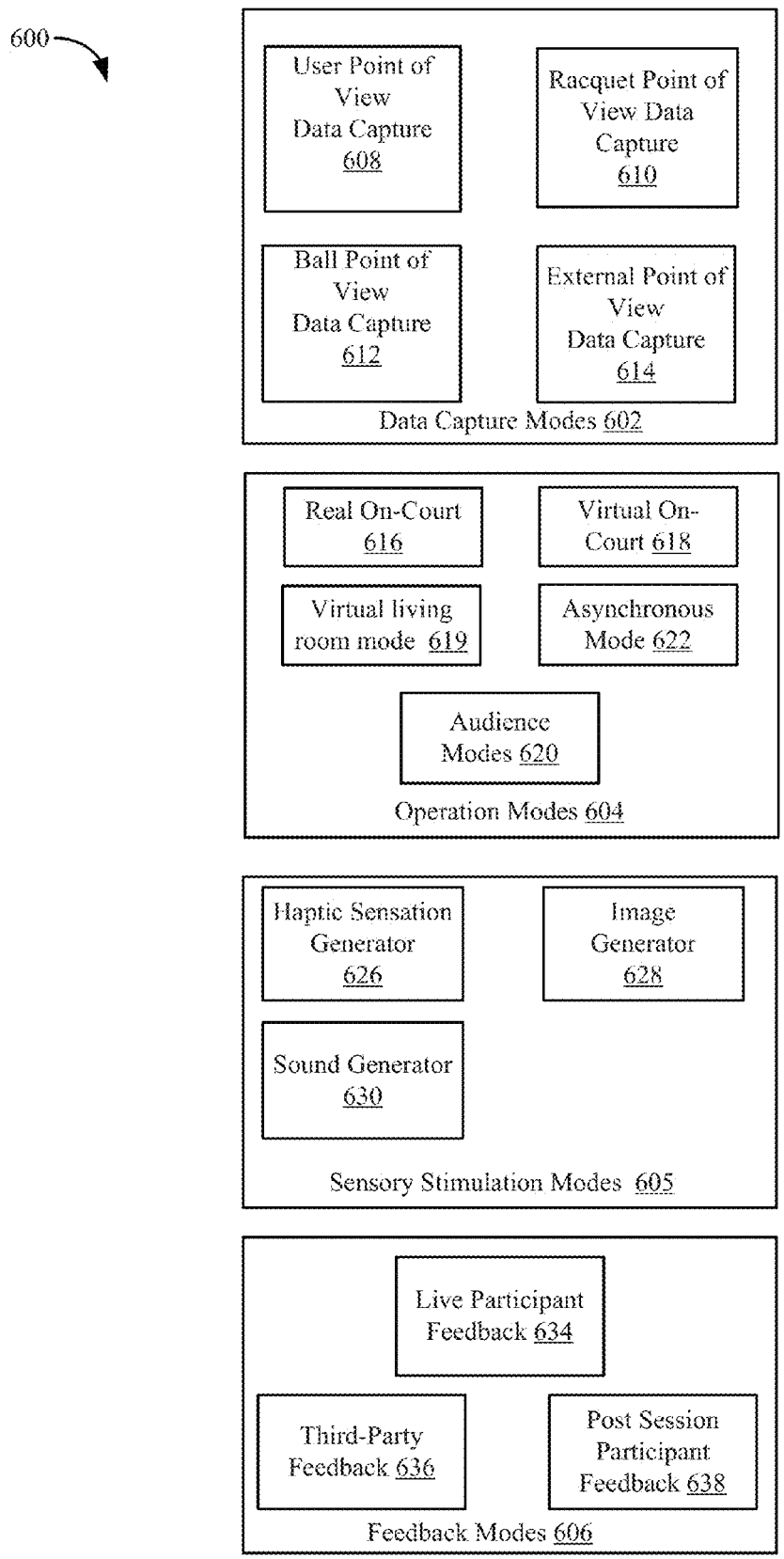
FIG. 9 is a block diagram of a system in accordance with the described embodiments.

FIG. 9 is a block diagram of a system 600. The system 600 includes data capture modes 602, sensory stimulation modes 605 and feedback modes 606, which are generated in accordance with one or more selected operational modes 604 of the system. In various embodiments, one or more the data capture modes 602, one or more the sensory stimulation modes 605, one or more the feedback modes 606 and one or more of the operational modes 604 can be active at a particular time. The combination of modes which are active can vary as function of time.

The data capture modes 602 can involve capturing data generated while a participant is using the system. For example, as described above, images can be captured while a person is playing tennis on a real court and against a real person. As another example, a person can swing a tennis racquet at a virtual ball and the system can be configured to capture data associated with the motion of the racquet and/or body motions of the person.

In one embodiment, data capture can be from a user's point of view 608. The user's point of view can refer to information captured from a device worn by the participant. Thus, the device will move from position to position as the person moves. For example, a participant can wear a GoPro™ camera to capture images from a wearer's point of view as the user moves from position to position. In another embodiment, a participant can wear a watch with various sensor capabilities, such as a three axis accelerometer and tilt sensors. Data from the accelerometer can be used to detect the motion of a person's wrist and possibly when a ball is struck if the item is worn on the wrist in contact with a held object, such as a tennis racquet. A sudden change in the acceleration of the watch can indicate when the racquet strikes the ball. In another embodiment, a person can wear shoes with sensor capabilities. Additional examples are described with respect to FIG. 11.

In a particular embodiment, a participant can wear smart glasses including one or more cameras on the glasses. Google Glass™ is one example of such a product. Google Glass™ includes video and still image capture, wireless connectivity (Bluetooth and WiFi), data storage (12 GB), audio transmission via a bone transducer, a display and a charger. The display is equivalent to a twenty five inch display viewed from eight feet away. It can be coupled to a user's mobile device to enable remote communications. The smart glasses can include other sensors, such as but not limited to a microphone, accelerometers, tilt, GPS, ambient temperature and biometric sensors (e.g., a heart rate monitor).

The smart glasses can be worn by the participant and because the glasses are moving in space, a 3-D position determination through parallax tracking can be made using only one camera. The parallax tracking involves determining a distance to the object from the camera, such as a tennis ball, a marked portion of the court or the net. Distance measurement by parallax is a special case of the principle of triangulation, which states that one can solve for all the sides and angles in a network of triangles if, in addition to all the angles in the network, the length of at least one side has been measured. Thus, the careful measurement of the length of one baseline can fix the scale of an entire triangulation network.

In the instance of a moving camera, a first distance can be determined between a first position of the camera and a second position of the camera where images are captured at the first position and the second position. The first position and the second position can be determined using sensor data, such as accelerometer data received from the smart glasses. Using the first distance, a second distance to a common object in images at both the first position and the second position can be determined. In one embodiment, to better refine the second distance determination, a position of the head, i.e., rotation and tilt, can be tracked from the first position to the second position.

In another embodiment, the smart glasses can include two forward facing cameras mounted to the frame. The cameras can be configured to take images at the same time. The distance between the cameras is a fixed distance which can be used to triangulate. With this information, a stereoscopic image can be generated where distances to various objects in the images from the cameras can be determined. This capability can be used in conjunction with the parallax tracking to determine a three-position of various objects in the images. For example, the distance to a ball, a distance to another person, a distance to the net captured in the two images can be determined. When the distance to various court markings is determined the distance information may allow a participant's position on the tennis court to be determined and tracked as a function of time.

In another embodiment, the smart glasses can include a range finder, which generates structured light (radio, infrared or laser light) or some other type of emitted signal (acoustic). An emitter can be coupled to the smart glasses. A detector can also be coupled to the smart glasses. The reflected signal can be detected and used to determine a distance to an object. The detector can be configured to detect reflected signals in a narrow range associated with the structured signal emitted by the emitter. The known shape and reflective properties of an object can be used to help identify the object from within the detected reflective signal which can include reflections from multiple objects. Further, the image data captured from a camera can also be used to identify the object in a detected reflected signal. For example, the position of an object in captured image data can be determined and then this information can be used to identify the object within reflected signals detected by a detector.

The smart glasses can have the ability to one or more of self-calibrate, self-position in real-time, ball track, body and body part (as necessary) track, racquet track and combinations thereof. Minimal calibration may be required, i.e., no extra work for the participant to prepare to use the system prior to playing a game of tennis. Thus, once the application is activated, the person can simply walk on the court and begin playing. One example of calibration may be to determine an initial position of the user on the court. Then, the accelerometer data can be used to extrapolate a new position of the user when the user moves.

The position data obtained from accelerometer data and the position data obtained from other sources, such as image data or from a range finder can be used in conjunction with one another. For example, based upon captured image data, a position of a user can be determined based upon detected court markings at a first position and a second position which may be some distance apart. Between the first position and the second position determined from the image data, the accelerometer data may be used to determine a position. The system can be configured to assess the accuracy of a position determination from a particular sensor source and select the position determined most accurate or optionally combine the position determinations from two sensor sources to provide a more accurate position determination.

In another embodiment, the smart glasses may also have the ability to detect the iris and/or face of the athlete. The iris and or face data can provide biometric information which is used to identify a user of the device and store the sensed data accordingly, i.e., associated with the particular user. In one embodiment, the smart glasses track the gaze direction of the athlete, i.e., the direction the person is looking or focusing. This information can be compared to a position of the persons head and a direction from which the ball is coming when receiving a ball or hitting a serve. Further, this information may reveal a break in concentration by the person or provide information which allows a participant to develop better ball tracking capabilities and focus.

In yet another embodiment, an images reflected in each of the participant's eyes can be captured. The system can be configured to detect objects in the reflected images and possibly determine a distance to objects on which the user is focusing. This approach may be used alone or in conjunction with outward facing image capture devices. In a further embodiment, a smart contact lens, which is worn by the user on their head, may be used to detect some type of information passing through the contact which can be used to identify objects. For example, the contacts may include a sensor array for capturing a particular wavelength light, such as visible or infrared light.

The racquet point data capture 610 can refer to sensors integrated into or coupled to an object held by the participant, such as a tennis racquet. The racquet can include or more sensors on the racquet to record racquet position, racquet motion and racquet feel to the athlete for every type of shot including various serves, various types of incoming ball speeds, trajectories and spins and various types of outgoing ball speed, trajectories and spins. The racquet feel can refer to the vibrations and resistance a person feels in their hands when swinging the racquet and hitting a ball.

Some examples of sensors can include but are not limited to cameras, accelerometers, tilt sensors, vibration detectors and microphones. In one embodiment, the system can be configured to record sounds that are made when a ball is hit. These sounds might be subsequently played back when a simulation of hitting a ball is generated. Further, the sounds may be used to determine some properties of the tennis ball and racquet, such as the ball spin and/or velocity when it is hit and/or the velocity of the racquet. In one embodiment, data captured from the racquet sensors might also be used to determine an athlete's ability to disguise the direction he is intending to hit the ball. Additional details of racquet sensors are described with respect to FIG. 10.

Ball point of view data capture 612 can refer to sensors integrated into a ball, such as but not limited to tennis ball. In particular embodiments, tennis balls can be used which include one or more integrated sensors, such as accelerometers. A communication interface can be provided with the sensors on the ball to retrieve information recorded by the sensor package. In some embodiments, this information can be done in real time. In other embodiments, the information can be gathered after a session, such as after the participant hits the ball a number of times. The smart ball can be configured with other collection devices, such as smart glasses, such that the timing of the data collection can be synchronized. For example, the smart glasses and smart ball can be synched with one another at the beginning a session, the smart ball can be hit a number of times during which it collects data, then the collected data can be uploaded to the smart glasses to be combined with information derived from the sensors on the smart glasses.

External point of view data capture 614 can refer to sensors placed in an environment around the participant. For example, as described above, a video capture device which captures images of a participant using the system can be used. For example, a camera on the participant's mobile device can be used to capture images of the participant. In another embodiment, sensors can be integrated into the net, the net supports or even into the tennis surface of the tennis court.

The simulation modes 605 can involve simulating one or more aspects of playing a game, such as tennis. For example, the feel of a tennis ball hit in a racquet can be simulated. In another embodiment, the smart glasses may have the ability to project to the participant's eyes one or more of a virtual ball, a virtual tennis court with markings, a virtual opponent, a virtual opponent's racquet or combinations thereof. The smart glasses can have varying levels of immersion. For example, a device, such as Google Glass™ (Mountain View, Calif.) allows the user to be visually aware of the surrounding environment while receiving visual images, which can be referred to as partial immersion. For example, images may be projected into only one eye. Whereas a device, such as the Oculus Rift by Oculus Rift VR™ (Irvine, Calif.) provides for total visual immersion, i.e., the user is only able to view images generated by the visual immersion device.

The sensation generator 626 can refer to generating the sensation of hitting a tennis ball. The sensation generator 626 can be used to generate the feeling of swinging and hitting an object even when the object is not present. For example, the vibration and resistance of hitting a tennis ball can be generated. In particular embodiments, the sensation generator can include mechanisms that generate vibrations and gyroscopes or other devices capable of generating angular momentum. The sensations which are generated can depend on the motion of the racquet, an orientation of the racquet and an incoming trajectory of a virtual ball. Further details are described with respect to FIG. 10.

The image generator can be used to simulate images of one or more of a virtual ball, virtual racquet, virtual person and a virtual tennis court as a function of time. For example, a ball approaching the participant can be generated and then the images showing the ball's trajectory after it is hit can be simulated. As another example, markings of a virtual court can be simulated.

The sound generator 630 can be used to generate different sounds associated with a hit tennis ball. These sounds can include the sound of a ball being hit by an opponent or the sound of a ball hit by the participant. These sounds can be associated with a simulation of a participant hitting a virtual tennis ball. For example, the sound can be emitted at a particular time during a swing corresponding to when a ball is hit (even though a ball is not hit, the sound can be emitted and the racquet can be made to vibrate). In one embodiment, as described above, the sounds can be based upon recording of sounds made when the participant is actually hitting a ball and can be changed according to various parameters, such as a detected orientation of the racquet, a detected speed of the racquet, a spin selected for the virtual ball and velocity components selected for the virtual ball.

The feedback modes 606 can involve providing feedback of different types to participants and third-parties. For example, feedback, such as a how fast a person hit a tennis ball can be provided while a person is playing a game of tennis to the person and/or a third-party. Other examples of feedback are described above with respect to FIGS. 1-8. Additional details of feedback types used in broadcasting are described in U.S. patent application Ser. No. 12/127,744, filed May 27, 2008, by Marty, which is incorporated by reference in its entirety and for all purposes.

The live participant feedback 634 can refer to feedback provided to a participant using the system in one of its operation modes. For example, live feedback can be provided while a person is playing a tennis game on a real court with a real person, playing on a real tennis court against a virtual opponent, hitting a ball against a wall, playing a virtual opponent in their living room where the virtual opponent is output on a video display or asynchronously playing a game against one or more individuals. In particular embodiments, the feedback can be provided before, during or after a participant hits a shot.

The third party feedback 636 can refer to feedback provided to a spectator or coach watching the participant. For example, feedback about the participant can be generated during a television broadcast of the person participating in a tennis match. The feedback can include information derived from data measure by the sensors.

The feedback generation can involve conversion to different points of view or from multiple points of view. For example, the trajectory of a shot can be drawn as it appears from the receiver's point of view, the hitter's point of view, a spectator's point of view or a line judge's point of view or combinations thereof. If a trajectory is measured from a particular point of view, such as the receiver's point of view using smart glasses, then a coordinate transformation can be performed to render it from another point of view, such as a spectator's point of view, using the position of the other point of view and the 3-D position data determined for the trajectory.

The post session participant feedback 638 can include reports associated with a session, such as information associated with some number of shots hit during a session. The information can include average parameters, such as an average serve speed for different types of serves or a number of times a participants shots hit a real or virtual net. The feedback can include a characterization of the person's skill level. The system can be configured to suggest exercises for improving their skills. For example, the post session feedback 638 may include a recommendation to practice hitting a certain type of shot which can be carried out in a virtual environment generated by the system 600.

The operational modes 604 can relate to environments in which the system is used. The real on-court mode 616 can involve a real participant, a real opponent, a real ball, real racquets with various sensor capabilities, such as smart glasses and/or racquet point of view data capture for at least one person. The game, such as tennis, can be played with no changes from the normal outdoor tennis game. In various embodiments, involving singles or doubles, sensing capabilities can be provided for one, two, three or all four of the participants and the system can be configured to track positions of multiple people over time and shots made by different people.

When multiple smart glasses are used simultaneously, then the system can collect and combine data from multiple users' points of view. For example, when the sender and receiver of a shot are both wearing smart glasses, a 3-D trajectory of a shot can be determined from the sender's point of view and the receiver's point of view. The accuracy of the trajectory determination may decrease from the sender's point of view may decrease as the ball recedes from the sender. However, from the receiver's point of view, the accuracy of a trajectory determination may increase as the ball approaches the receiver. Thus, the two most accurate portions of the trajectory determinations from the two devices can be combined to provide a more accurate trajectory determination.

In some embodiments, two or more detection devices, such as smart glasses, can be configured to work in tandem to provide feedback. For example, a first smart glasses or sensors coupled to a tennis racquet of a person hitting a ball can be configured to detect how fast the ball was hit or a type of shot that was hit. This information can be sent to a second set of glasses worn by a second person to provide feedback possibly even before the shot has arrived. This type of feedback might be useful for training purposes as it might help a person to learn to associate particular visual clues of how an opponent moves with a type of shot being hit and improve their reaction times.

Data can be collected to allow the game to be replayed digitally. For example, in a simulation, a participant can replay one or more points in the game. Using the collected data, one or more of the participant's location, each swing motion, each ball strike, each ball flight, each court contact, etc. can be categorized to assess the ability of the participants to replicate a desired outcome. Also, the data can allow the system to assess the participant's ability to make appropriate strategic shot-choice decisions given the parameters of the oncoming ball and the opponents position and skill level.

Virtual on-court mode 618 can involve a real participant, real or virtual opponents, a virtual ball, smart glasses and a haptic sensation generator 626. The virtual on-court game can be played with athlete seeing a virtual ball projected through the smart glasses. In one embodiment, the smart glasses and haptic sensation generator can be programmed prior to the game using data collected from real-court games the participant played in the real on-court mode 616. In alternate embodiments, the participant can play games generated by other participants in the real on-court mode 616. Games from players of different skill levels can be selected where the participant can select a game from a player of a greater skill level, the same skill level or a lesser skill level. In some embodiments, professional players can have their games recorded and a participant may be able to even play against a professional tennis player.

The smart glasses and haptic sensation generator 626 may be updated in real-time using information captured during the virtual on-court game. For example, based upon the selected properties of the virtual tennis ball and the measured properties of the racquet swing, a particular racquet sensation can be selected and output which is felt by the player. In addition, a particular sound can be selected and output. Further, a virtual trajectory of the tennis ball can be generated and the smart glasses can be configured to project a trajectory of the virtual tennis ball determined to result from swing. If desired, the player can practice the same shot multiple times prior to advancing to a next simulated shot.

In one embodiment, a virtual opponent or opponents can be projected through smart glasses. In another embodiment, the participant may see a real opponent wearing another pair of smart glasses moving around the court responding to a virtual tennis ball. With the glasses, the participant may move in a realistic way on the court and feel a realistic sensation from each the haptic sensation generator associated with each hit of the ball.

In another embodiment, two real players and two virtual players can engage in doubles. The two real players can be on the same side or can each have virtual partners. The position of each virtual player can be available to each real player according to their view point. For instance, when the real players are on different sides, the image of a back of a virtual player or no image at all can be projected to a real player depending on the position of the virtual player relative the real player. Whereas, the front of the virtual player across the net can be visible to the other real player.

As in the real on-court mode 616, data can be captured allowing the game to be replayed. For example, one or more participant's location, swing motion, virtual ball strike, virtual ball flight, virtual court contact, etc. can be captured and stored. Subsequently, the system can be configured to categorize this data to assess the ability of the participant to replicate the desired outcome (i.e., hit the ball in the same way each time for a particular shot). Additional details of parameters for determining motion consistency related to a participant's ability to replicated a desired outcome are described in described in previously incorporated U.S. patent application Ser. No. 13/780,970.

In addition, an assessment of the participant's ability to make appropriate strategic shot-choice decisions can be made given the parameters of the oncoming ball (real or virtual), the opponent's position/capability and the participant's position. In addition, the system can be configured to allow a participant to try out different shot-choice strategies, such as returning the ball in a particular manner with a particular type of shot. In one embodiment, the system can be configured to recommend a shot return strategy consistent with the player's capabilities and/or the opponent's capabilities. A shot recommendation can be one type of live participant feedback which can be provided.

The player's capabilities can be measured, analyzed and characterized by the system. Player's skill levels can be assessed for different types of shots, such as different types of return shots or different types of serves. Based upon, a skill level of a player and analysis of a ball approaching the player, the system can recommend a return shot that will be likely most successful for the player given their skill level. In one embodiment, the skill level of the opponent can be considered, i.e., will the shot be easy to return for the opponent. If the player wishes to use a non-recommended shot, the system can be configured to suggest training exercises that can improve their skills at a particular shot and increase the likelihood of it being successful.

In another embodiment, a probability of a player making a particular shot to a particular location on the court can be determined. Based upon the variability in the consistency with which a player makes shots, a Monte Carlo simulation can be carried out. The Monte Carlo simulation can predict an area range in which the ball is likely the land as well as a velocity upon landing. The simulated area range can be compared to the selected target area to determine a probability of the ball landing in the target area. This estimated probability can be output as feedback and may provide the participant the ability to compare shot probabilities for the purposes of their shot selection.

A related method for basketball, which can be applied to tennis, is described in more detail with respect to previously incorporated U.S. patent application Ser. No. 12/127,744. In basketball, the hoop is the target area. To apply to tennis, a virtual target area on the surface of the tennis court can be selected. As another example, a virtual target area, such as a box in the plane in the net above the net can be selected. Based upon this target area, a determination can be made in regards to a probability of a particular shot clearing the net.

In another embodiment of virtual on-court mode 618, a player can play on some surface which is not a tennis court, e.g., on an asphalt parking lot, a homes' backyard, an indoor basketball court, etc. The smart glasses can be configured to generate and project virtual court markings which can define a range of movement in area of which the game is being played. If the area permits, the virtual court marking can be the size of regulation tennis court. However, if the space doesn't permit or by participant choice, a tennis court of a smaller size (or even larger size can be selected).

In various embodiments, the system can be configured to receive a selection of various parameters for a virtual game, such as a width of the court, a length of the court and a height of the net, which vary from a standard tennis court. In one embodiment, two players competing against each other can play on virtual courts of different sizes or nets of different heights. For example, the virtual net for one player may be higher or lower than the virtual net of the other player playing the game where the system projects, the respective net heights to each player via their glasses. As another example, the court can be wider or longer for one participant as compared to another participant. These differences can provide handicaps which allow two players of different skill levels to compete against each other in a more fun way.

Virtual living room mode 619 can involve a real participant, one or more virtual opponents, a virtual ball, a virtual court, an image generator 628 (e.g., smart glasses), data capture devices (e.g., also smart glasses) and a haptic sensation generator 626. Generally, the virtual living room mode can be defined as some indoor space, such as a living room where the available range of motion is limited. For example, for a particular shot, the available space may allow a participant to only step one leg forward during a shot and then swing the racquet. As described above, the system can be configured to account for spaces of different sizes indoors or outdoors and adjust game parameters accordingly.

In one embodiment, the smart glasses (or other image generator 628) and haptic sensation generator can be programmed prior to the game using data collected from real-court games that the system users have played using the system. In other embodiments, data from virtual on-court games can also be utilized. The virtual living room game can be played with the user seeing a virtual ball projected through the smart glasses or output to a video display. Other visual components, such as a virtual opponent, court markings and a net can also be projected through the smart glasses or on a display. In one embodiment, a combination of video display and smart glasses can be utilized. In another embodiment, a 3-D video display can be utilized where images are generated which when output on the 3-D video display convey a distance from the user to an object, such as a distance between the user and a ball.

During play, the user athlete can move in a simplified way in the living room and then the user's movements can then be projected onto the virtual tennis court. The participant swings the haptic sensation generator at the virtual ball and feels a realistic sensation from each virtual connection with the virtual ball. Again, data can be collected to allow the game to be replayed digitally. Again, the system can be configured to assess the participant's ability to make appropriate strategic shot-choice decisions given the parameters of the oncoming ball and the opponents position and capability.

Asynchronous Mode 622 can be configured to allow games to be played asynchronously when the opponent(s) are not available at the same time. Multiple games can be played in parallel. As an example, the system can initialize one or more asynchronous games. During initialization, game parameters can be selected for each player, such as court and net dimensions. In addition, an indoor or outdoor venue can be selected. For an outdoor venue, parameters, such as a range of wind speeds can be selected. During game play in outdoor venue, wind can be introduced randomly within the range of selected wind speeds. The system can be configured to take into account the wind speed in calculating the ball dynamics. In another example, a court surface can be selected, such as grass, clay or a synthetic surface. The surface properties can be used in determining ball dynamics. In one embodiment, the surfaces for each player can be different, such as grass for one player and clay for the other player.

After initialization, Person A can serve using the smart glasses and haptic sensation generator 626 to generate their virtual toss, virtual service swing and virtual serve result. This result can be saved and then sent to person B. At a later time, person B can use smart glasses and a haptic sensation generator 626 to generate their virtual serve from person A and hit a virtual service return. At a later time, Person A can use the smart glasses to see the service return and hit the ball back into Person B's court. Play can continue until the ball is missed, hit out of bounds or hit into the net. The game can be automatically scored.

As described above, multiple games can be played in parallel. Thus, in the example above, Person A might make a plurality of serves using their smart glasses. The serve results can be sent to a single recipient or multiple recipients and the games can be played out between the single recipient and Person A or between multiple recipients and Person A.

In yet other embodiments, Person A and Person B can take turns using smart glasses and the haptic sensation generator or may each have smart glasses and share the haptic sensation generator. With the glasses and haptic sensation generator, person A can see images of the virtual ball approaching, receive a sensation of hitting the virtual ball and then see images of the virtual ball receding. Then, Person B can receive the glasses and the haptic sensation generator and then receive images of the virtual ball approaching and attempt to hit it.

In another embodiment, Person A can play a match against themselves. Person A can hit the virtual tennis ball and then a trajectory of the virtual tennis ball can be predicted. Then, the system can configured to generated images of the virtual they just hit approaching assuming Person A is in some relative position to the virtual ball. Then, Person A can again attempt to hit the virtual ball.

The system can be configured to generate images which mimic the appearance of a tennis ball approaching each person in real life from an eye level perspective. As described above, the glasses can be worn a user to capture this type of image data from a user which can serve as a basis for generating the images which mimic the appearance of a tennis ball in real life. However, the system is not limited to using only the captured perspective from real life and may also be able to adjust the perspective of the virtual tennis ball on the fly to account for factors, such as movement of the body user while trying to hit the virtual tennis ball including a position on the ground and/or a position of their body, such as their head height and gave direction.

The appearance of an object, such as real tennis ball, approaching a user can vary depending on the height of a user's head above the ground, a tilt of the user's head, a position (distance) of the user relative to the real object as a function of time. For example, in tennis, a person can be running toward an object and crouched over prior to it being hit or may remain in one spot from the time the ball is hit while standing straight up. The system can be configured to account for a distance and orientation of their eyes relative to the virtual ball as a function of time when generating the images of the virtual ball which are output to the user. The sensors worn by the user or remote sensors can be used to capture this information in real-time as the user is trying to hit the virtual ball and then the images output by the system can be altered to account for this change in viewing perspective.

A training exercise may involve the user receiving a virtual tennis shot from a number of different starting position. When the user is standing still, the system can designate a starting position for the user, and then start generating images which are output to the smart glasses. The user can then attempt to physically move to a location to hit the virtual tennis ball. The system can keep track of the user's position while moving and then adjust the images of virtual tennis ball which are output to the user as they are moving to account for the changes perspective which would occur in a real life situation. Further, the system can keep track of the user's position to predict whether they hit the virtual tennis ball or not.

After the virtual tennis ball is determined to be hit or missed and the person stops, the system can be configured to replay the shot assuming the person is in a new initial position when the shot is hit and then generate the images of the virtual tennis ball accordingly and the person can again try to hit it. On a real-tennis court, a person might physically go to stop pre-determined location on the tennis court prior for each virtual shot hit towards them and then the system can generate the images. However, this is not required as the system can be configured to generate the perspective of a virtual shot approaching a user from any relative starting position independent of where a person is physically located.

Training exercises may involve a person trying to return the same virtual tennis shot starting from the same starting location (Again, physically the person doesn't have to be in the same location but the perspective of images can be generated as if the person is starting in the same starting location relative to the shot). The system may provide feedback, such as how long it takes for the person to reach the spot where the virtual ball is hit, what location at which the virtual ball was hit, suggest an optimal location and path to reach prior to hitting the virtual ball. This information may be correlated with the results of the predicted trajectory of the virtual return of the shot.

In a mixed reality situation, where the user can see physical objects, the system can be configured to blend the virtual tennis ball with the physical objects based upon where the user is looking. For example, the system can be configured to keep track of physical net and a user's eye position simultaneously. In one embodiment, cameras worn the user's head might keep track of the position of net as seen by the user while they are trying to hit a virtual shot, then the images of the virtual ball can be generated such that the correct position of the virtual ball relative to the physical net is maintained relative to the user's eyes perspective.

The audience mode 620 can allow games described above in each of the real on-court mode 616, the virtual on-court mode 618, the virtual living room mode 619 and the asynchronous mode 622 to be watched by other individuals. The results can be viewed in real-time or delayed. The system can be configured to allow particular segments of game to be replayed, such as different shots. The system can provide feedback information about the shots, such as shot assessments and feedback parameters described above with respect to FIGS. 1-8. This feedback information may also be available to the participant hitting the shot in some form. The audience mode 620 may be output in 2-D or 3-D. Further, the system can be configured to allow viewing of the action from different points of view, such as from the point of view of a real or virtual opponent.

Figure 10:
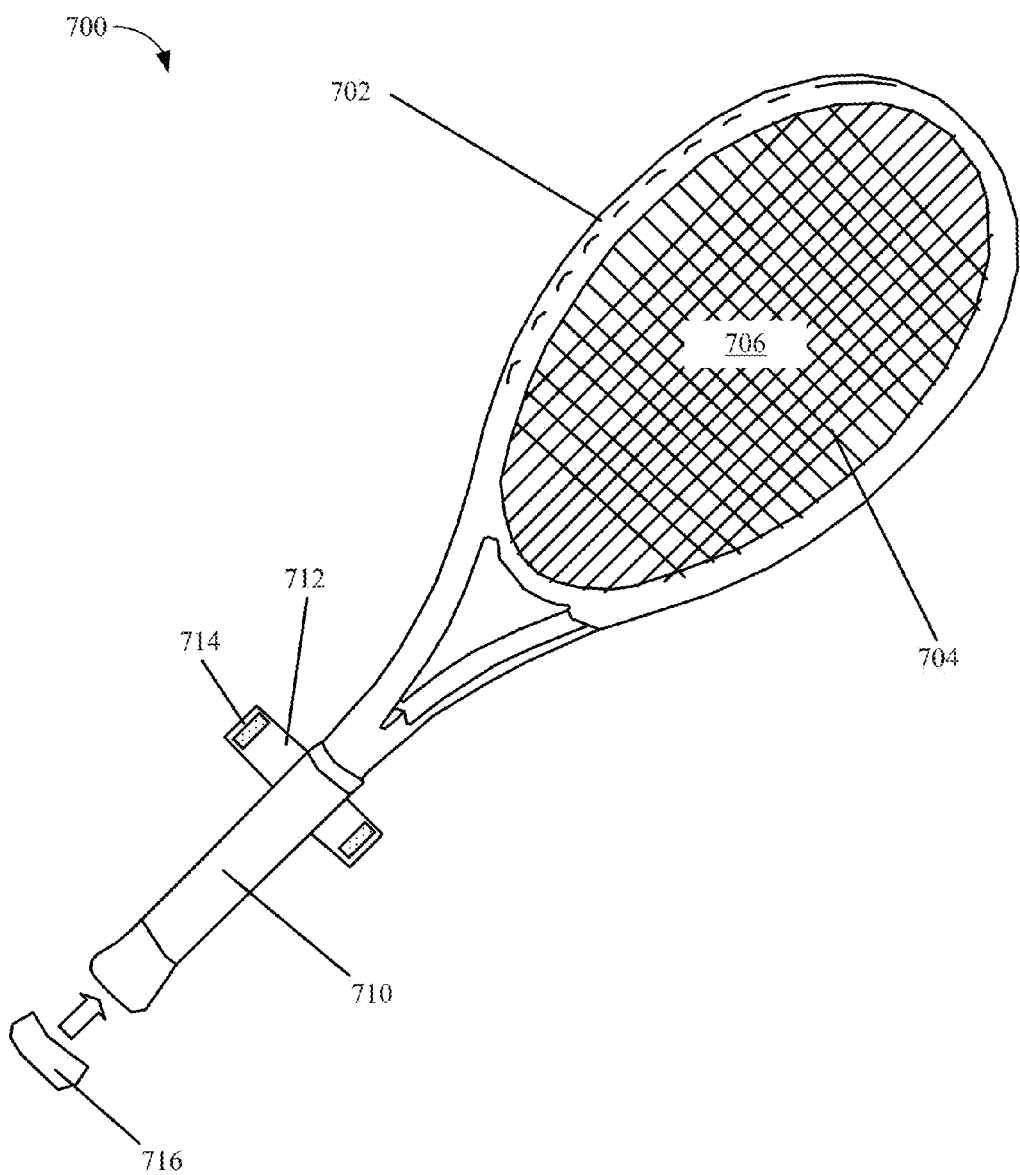
FIG. 10 is a perspective diagram of a tennis racquet in accordance with the described embodiments.

FIG. 10 is a perspective diagram of a tennis racquet 700. The tennis racquet 700 includes face 706, strings 704, a frame 702 and a handle 716. In one embodiment, sensor packages, such as 712 or 716 can be coupled to racquet 700. Many different sensor packages including different sensors can be utilized. In one embodiment, accelerometers and tilt sensors can be include in a sensor package to allow an orientation, position and velocity as a function of time of the racquet 700 to be determined. In another embodiment, the sensor package can also include one or more cameras and microphones for recording image data and sound data associated with the racquet 700. For example, camera data might be used to check a player's grip or record a ball hitting the racquet. The sensor packages can include a power source and a communication interface to enable wireless and/or wired communications.

In one embodiment, a sensor package can be coupled to an existing racquet. For example, sensor package 716 can be coupled to racquet 700 as an end cap that slides over the bottom of the racquet 700. In another embodiment, the sensor package can be embodied as a strap 712 which is secured to the racquet handle 710 using Velcro strips. The external sensor packages, 712 and 716, can be light enough so that the balance of the racquet is not significantly affected.

In other embodiments (not shown), the sensor package can be integrated into the handle 710. In another embodiment, sensors can be used to measure a tension on the strings. For example, the electrical properties of the strings may change when impacted with a ball. These sensors may be used to determine when a ball strikes the tennis racquet and possibly to determine a location on the racquet face 706 where the ball hits the racquet. With knowledge of where the ball hits the face of a racket 706, feedback in regards to whether the ball was hit in the sweet spot of the racquet.

In one embodiment, a haptic sensation generator can be provided. The haptic sensor generator can be used to generate a feeling associated with a ball hitting a tennis racquet 700. This effect can be used to simulate hitting a real ball when the user is swinging at a virtual ball. The haptic sensation generator can be integrated into the handle or provided as a separate device which is coupled to the racquet.

One type of feeling can be a vibration which is produced when a ball is hit. Different vibrations can be selected for different types of shots. Further, the vibration which is output can depend on an orientation of the racquet when a racquet is swung at a virtual ball, the selected properties of the virtual ball, a rate at which the racquet is swung and a location on the racquet where the virtual ball is determined to hit the real racquet.

The orientation and movement of the racquet can be measured using a sensor package. The vibrations can be generated using one or more mechanical actuators. When the racquet is determined to hit the virtual ball, control signals can be sent to one or more of the actuators to introduce a particular vibration pattern where the vibration pattern can be varied from shot to shot.

Another type of feeling is force feedback. When a real racquet hits a real ball, there is a feeling of resistance. In one embodiment, one or more masses can be rotated via one or more actuators to generate force feedback. The force feedback can be generated in response to a determination that a virtual ball has been hit. It can be activated in conjunction with a vibration device to simulate the feeling of force resistance of a ball being hit.

In a particular embodiment, one or more pairs of counter rotating masses can be controlled to generate varying degrees of force feedback. The masses can be configured such that when each is rotated at a specified velocity the generated angular momentum cancels one another. To provide force feedback, the rotational velocities of each of the masses can be varied to generate varying amounts of force feedback. In another embodiment, one or more gyroscopes can be controlled to generate varying amounts of force feedback. Similar to the vibrational feedback, the amount of force feedback can be varied according to an orientation of the racquet, a rate at which the racquet is swung, a location where the virtual ball is projected to strike the tennis racquet and a velocity and direction of a virtual ball at which a user is swinging.

In yet other embodiments, sensors can be used which allow a determination of the whether the racquet is being held with one or two hands (e.g., a contact sensor or a light sensors can be used). The light sensors can detect whether a portion of the racquet is covered or not, such as by a user's hands. The sensors may also be able to determine how hard the user is gripping the racquet (e.g., a pressure sensor can be used).

When a ball is hit, the sensor package can be used to determine the forces and vibrations transmitted through the user's one or two hands. This information may be generated when a user hits an actual tennis ball. It can be correlated with additional data, such as data, in regards to the trajectory and spin of a tennis ball which hit the racquet to generate the forces, a location where the ball hits the racquet face, an orientation of the racquet of the racquet and velocity of the racquet. This information can be recorded for many shots to build up a database vibrations and for forces experience by a user when the user hits a tennis ball with a particular type of racquet.

Based on the information captured while a user hits real shots, a unique haptic feedback model can be constructed for providing the user with haptic feedback when the user is swinging at a virtual tennis ball. The haptic feedback model can be generated to correlate with the forces and the vibrations the user feels when hitting an actual tennis ball.

In one embodiment, the haptic feedback model can include adjustable parameters which affect the magnitude and distribution of the vibrations and force feedback. The parameters may be adjusted in response to user input to allow the user to change the feel of the device which implements the haptic feedback model. For example, the adjustable parameters might allow the user to feel how different tennis racquets feel when a ball is hit.

In the absence of data user-specific data, a haptic feedback model can be selected for the user. The haptic feedback model can be selected based upon such criterion as the type of tennis racquet a person uses, their gender, hand size, weight, length of their arms, height, skill level, age, etc. With the criterion, the user may be presented with a number haptic feedback models which can be selected by the user and recommendations for the user. The presented haptic feedback model may have been previously generated based upon data captured from other individuals hitting a real tennis ball with a real tennis racquet.

Figure 11:
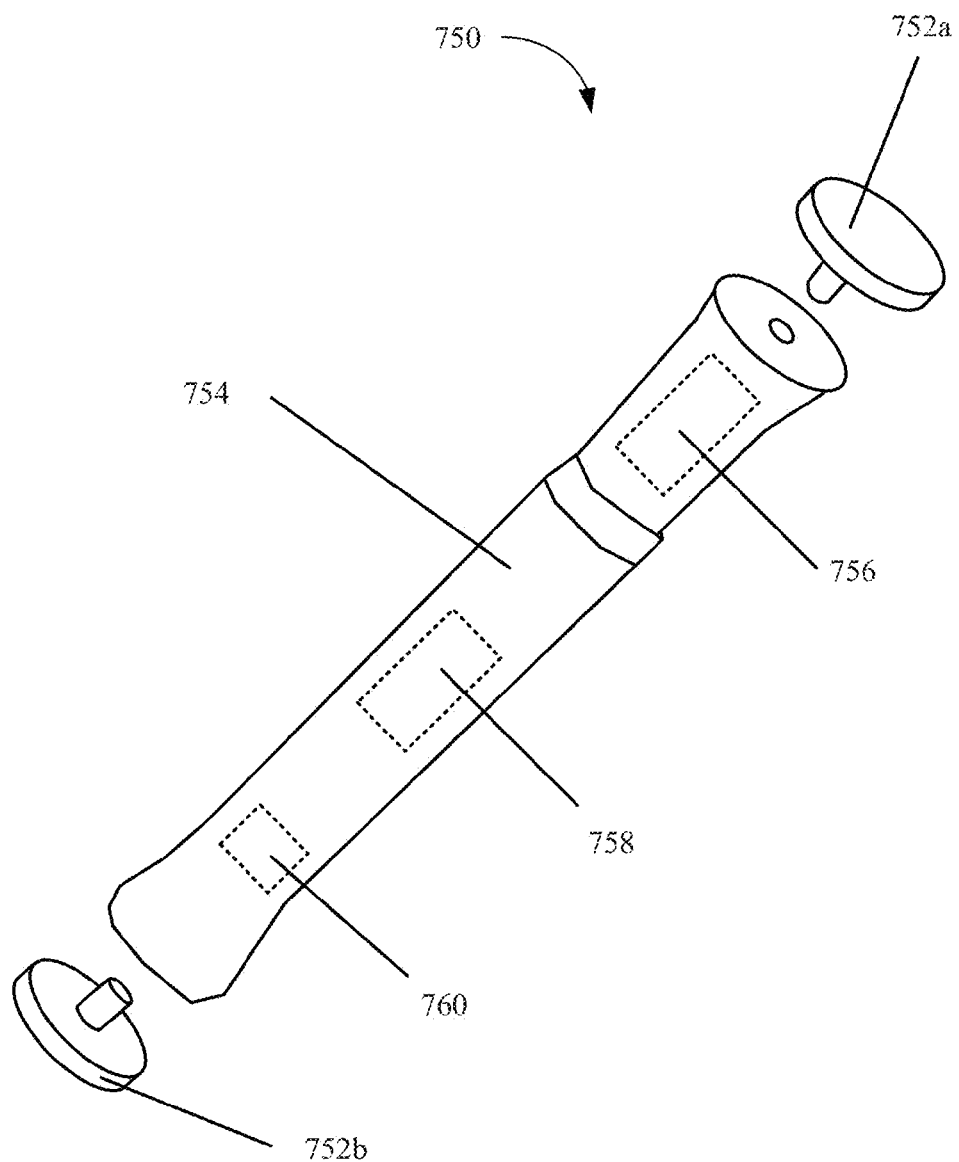
FIG. 11 is a perspective diagram of a hand held device in accordance with the described embodiments.

FIG. 11 is a perspective diagram of a hand held device 750. For tennis, the device 750 can be the size of a tennis racquet. For other types of sports, the device 750 can be a different size. The device 750 can include a body 754. Weight attachments 752*a* and 752*b* can be provided where different weight amounts can be attached to simulate the feel and balance of different racquets. The feel can match the balance of actual racquets.

A force feedback mechanism 756, a vibration mechanism 758 and one or more sensors 760 can be integrated into the body 754. In addition, a power source and communication interface can be provided. Further, the device can include a processor and a memory. The processor and the memory can be configured to receive sensor data and actuate the vibration mechanisms and force feedback mechanisms. The vibration mechanisms and force feedback mechanisms can be controlled based upon control signals received from remote devices, such as the smart glasses. For example, a remote device can send commands which cause a particular vibration and a particular amount of force to be generated.

In one embodiment, the device can include a speaker. The speaker can be configured to output a sound of a ball being hit. The sound which is output can be synchronized with the vibration mechanisms and force feedback mechanisms.

During operation, a user can swing the device 750 at a virtual ball which is generated and viewed by the user. For example, the virtual ball can be projected into the user's eyes via smart glasses. The properties of the virtual ball can be determined from an application executing on device 750, executing on a remote device, such as the smart glasses or executing on a mobile device, such as a smart phone, communicatively coupled to the device 750. Further, the properties of the racquet face can be simulated, such as its size and orientation. In one embodiment, a virtual racquet head and face can be projected into the user's eyes when the user is determined to be looking at the racquet. Based upon at least, the properties of the virtual ball and sensor data from device 750, such as a rate of movement, direction of movement and orientation of the device 750, an impact time can be determined. At the determined impact time, the vibration and/or force feedback mechanisms can be actuated.

Figure 12:
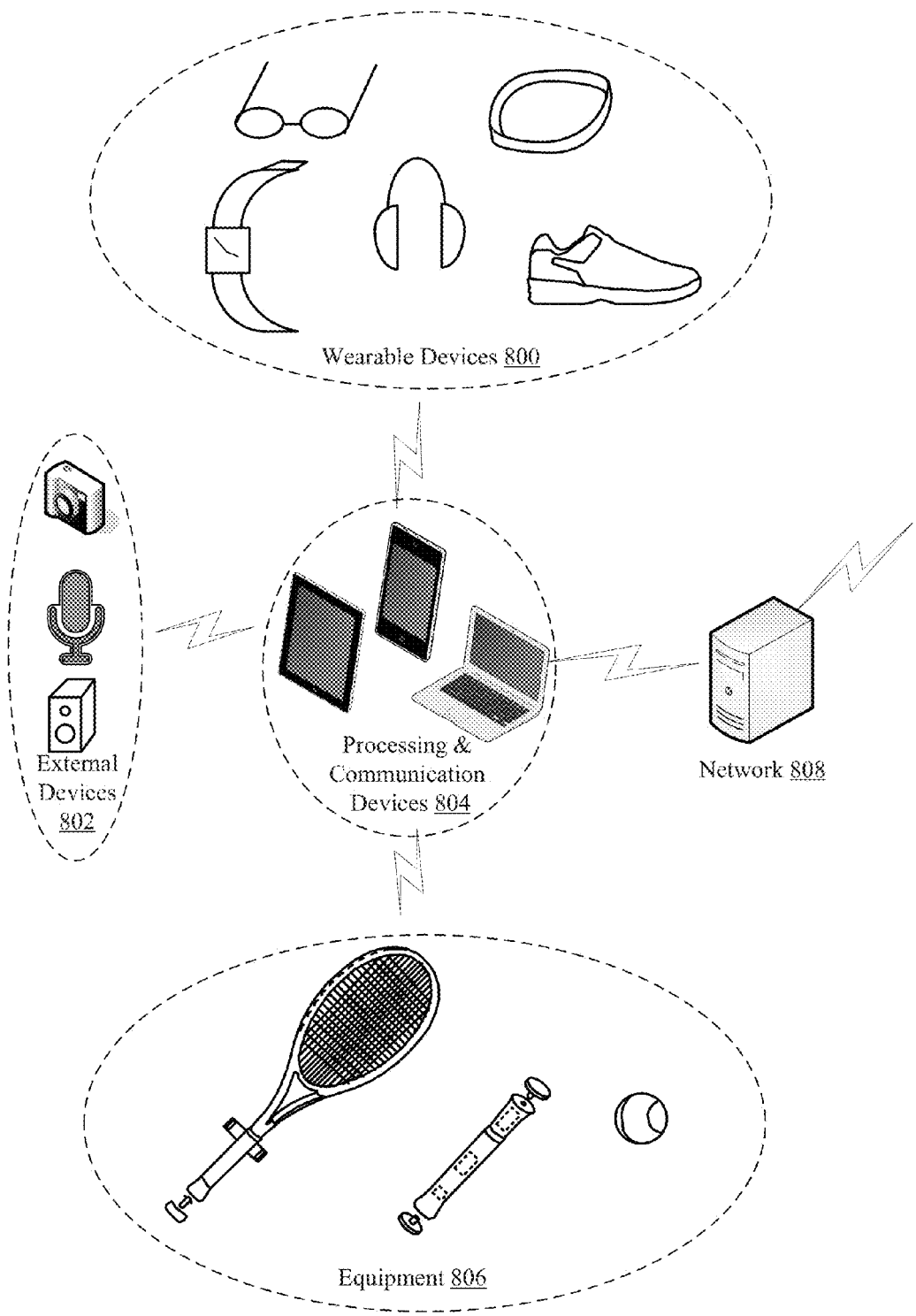
FIG. 12 is a block diagram of a system in accordance with the described embodiments.

FIG. 12 is a block diagram of a system. The system can include wearable devices 800, such as smart glasses, watches, headphones, shoes and bands (e.g., wrist, arm or headbands), which can include sensors. The sensor data can be used to track a position of a user as a function of time and/or one or more body parts as a function of time. The devices 800 can include mechanisms for providing feedback. For example, audio feedback can be output via the head phones or visual feedback can be provided via a display coupled to the smart glasses or watch.

The wearable devices 800 can be configured to wirelessly communicate with each other and with other remote devices, such as laptops, tablets and phones, in the processing and communicating devices 804. These devices can provide processing and communications capabilities which can be used alone or in conjunction with any processing and communication capabilities found on the wearable devices. For example, the wearable devices may work with an application executing on a mobile device in 804. The processing and communication devices 804 can be configured to communicate with a remote network 808 and associated remote devices, such as remote servers.

Further, the processing and communication devices 804 can have one or more of any of the type of sensors described herein. For example, a mobile phone can include cameras, depth sensor, accelerometers and tilt sensors. The mobile phone might be worn to track a position of the user. As described above, it may also provide processing and external communication capabilities. In general, the sensors described herein, such as accelerometers, depth sensors, tilt sensors, cameras, microphones, etc. alone or in combination with one another, can be included in any of the wearable devices, external devices, processing and communication devices.

In some instances, a device with a sensor can be used in different modes. For example, a device, such as a mobile device, can be held and swung at a virtual ball. Then, vibrations can be output on the mobile device to indicate when the virtual ball is struck. In another example, the mobile device might be set up at a fixed location and used to record image data where the image data is used to determine a trajectory of an object, such as a real tennis ball, or determine a location of a user on a tennis court.

External devices 802, such as a speaker, camera and microphone can be used to provide sensor data and output feedback. The equipment 806, such as the tennis racquet, the handheld device and tennis ball can have sensors, vibration and force feedback mechanisms and varying degrees of communication capabilities.

The communications are shown for illustrative purposes only and are not meant to be limiting. For example, the equipment 806 doesn't necessarily only communicate with the processing and communication devices 804. In some embodiments, the equipment 806 may communicate directly with a wearable device, such as smart glasses, in 800, directly with one of the external devices, such as 802 or directly with a remote server on network 808. Further, different equipment items 800 may communicate with one another. For example, a tennis racquet with sensing and processing capabilities can be configured to communicate with a smart ball with sensing capabilities. Yet further, one or more of the wearable devices may communicate with one another. For example, smart glasses can be configured to communicate with watch with sensor, processing and remote communication capabilities.

In particular embodiments, the system operation can be enhanced with some audio or visual commands. For example, the smart glasses can be configured to accept verbal commands to record particular shots, delete recorded shots or mark a particular shot for review. The smart glasses can be configured to detect eye movements or blinking which also might be used to trigger functions. The smart glasses can be used for other games which use a sports device that contacts a sports ball (golf, lacrosse, baseball, etc.). Devices which provide sensory stimulation modes applicable to each sport can be utilized with the smart glasses.

Embodiments of the present invention further relate to computer readable media that include executable program instructions for performing recruiting techniques described herein. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of non-transitory computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A non-transitory computer readable medium configured to store a computer program used by a computer, the computer readable medium comprising:
    computer code configured to control generation of images of a virtual tennis ball as a function of time which are output to a display worn on a user's head which delivers images into at least one of a user's eyes to mimic a position of a real tennis ball as the function of time approaching a user;
    computer code configured to determine (1) speed, position, and orientation of a hand-held device as the function of time based upon sensor data from one or more sensors, (2) when the virtual tennis ball is hit by the user based upon the position and the orientation of the hand-held device as the function of time and a virtual position of the tennis ball as the function of time, and (3) an orientation of the hand-held device relative to the virtual tennis ball when the virtual tennis ball is determined to be hit by the user;
    computer code configured to determine a spin of the virtual tennis ball based upon the speed of the hand-held device as the function of time and the orientation of the hand-held device relative to the virtual tennis ball when the virtual tennis ball is determined to be hit by the user;
    computer code configured to calculate a trajectory for the virtual tennis ball based upon the speed of the hand-held device, the spin of the virtual tennis ball, and the orientation of the hand-held device relative to the virtual tennis ball when the virtual tennis ball is determined to be hit by the user;

when the virtual tennis ball is determined to be hit by the user, computer code configured to trigger a haptic sensation generator in the hand-held device wherein the haptic sensation generator transmits one or more haptic sensations to the user which mimic a feel of the real tennis ball being hit; and computer code configured to control, based upon the calculated trajectory, generation of second images of the virtual tennis ball which are output to the display worn on the user's head and which show the virtual position of the virtual tennis ball as the function of time after the virtual tennis ball is determined to be hit moving away from the user according to the calculated trajectory.

2. The computer readable medium of claim 1, wherein the user, when viewing the display, is also able to view real objects around the user to provide a mixed reality experience wherein the images of the virtual tennis ball are generated to blend with the real objects.

3. The computer readable medium of claim 2, wherein the objects are a real net and real court markings on a real tennis court.

4. The computer readable medium of claim 1, wherein the one or more haptic sensations include vibrations.

5. The computer readable medium of claim 1, wherein the one or more haptic sensations include force feedback.

6. The computer readable medium of claim 5, further comprising computer code configured to control angular velocities of one or more rotating mass wherein the angular velocities are selected to generate a selected amount of force feedback based upon a velocity of the virtual tennis ball.

7. The computer readable medium of claim 1, further comprising computer code, based upon the position and the orientation of the hand-held device as the function of time, configured to determine a location where the virtual tennis ball impacts a face of a virtual tennis racquet.

8. The computer readable medium of claim 7, wherein the one or more haptic sensations are generated based upon the location where the virtual tennis ball is determined to impact the face of the virtual tennis racquet.

9. The computer readable medium of claim 7, further comprising computer code configured to determine whether a 3-D trajectory associated with the virtual tennis ball intersects the virtual face.

10. The computer readable medium of claim 1, further comprising computer code configured to determine a position of a virtual face of a virtual tennis racquet as the function of time based upon the position and the orientation of the hand-held device as the function of time.

11. The computer readable medium of claim 1, wherein the hand-held device is a real tennis racquet further comprising computer code configured to, based upon the position and the orientation of the real tennis racquet as it is swung by the user, determine a location where the virtual tennis ball would impact a face of the real tennis racquet if the virtual tennis ball were the real tennis ball.

12. The computer readable medium of claim 1, further comprising computer code configured to determine a position of the user as the function of time prior to and while the user is swinging the hand-held device at the virtual tennis ball.

13. The computer readable medium of claim 12, further comprising computer code configured to determine whether the virtual tennis ball is hit based upon the position of the user as the function of time prior to and while the use is swinging the hand-held device.

14. The computer readable medium of claim 1, further comprising computer code configured to generate the images including one or more of a virtual net, virtual court markings, a virtual opponent or combinations thereof as the function of time.

15. The computer readable medium of claim 1, further comprising computer code configured to control generation of third images of the virtual tennis ball to the display which show the virtual position of the virtual tennis ball as the function of time after the virtual tennis ball is determined to be hit by the user such that the virtual tennis ball is moving towards the user from the perspective of the real tennis ball as viewed through the user's eyes on the tennis court to allow the user to attempt to return the virtual ball which was previously hit by the user.

16. The computer readable medium of claim 1, wherein after the second images are generated, the display is worn by a second user and the hand-held device is held by the second user further comprising computer code configured to control generation of third images of the virtual tennis ball to the display which show the virtual position of the virtual tennis ball as the function of time after the virtual tennis ball is determined to be hit by the user such that the virtual tennis ball is moving towards the second user from the perspective of the real tennis ball as viewed through a second user's eyes on the tennis court to allow the second user to attempt to return the virtual ball which was previously hit by the user.

17. The computer readable medium of claim 1, further comprising computer code configured to determine a position of the user as the function of time relative to the position of the virtual tennis ball as the function of time.

18. The computer readable medium of claim 17, wherein the images of the virtual tennis ball approaching the user are based upon the position of the user as the function of time relative to the position of the virtual tennis ball as the function of time.

19. The computer readable medium of claim 1, wherein the hand-held device is configured to detect whether it is being held with one or two hands further comprising computer code configured to generate the one or more haptic sensations based upon whether the one or the two hands are holding the hand-held device.

20. A non-transitory computer readable medium configured to store a computer program used by a computer, the computer readable medium comprising:

computer code configured to receive image data from one or more sensors worn on a user's head wherein the image data includes images of a real tennis ball being hit towards the user on a real tennis court;

based upon the image data, computer code configured to determine a position of the real tennis ball as a first function of time;

computer code configured to control generation of images of a virtual tennis ball as a second function of time which are output to a display worn on the user's head which projects images into at least one of a user's eyes to mimic a position of the real tennis ball as the function of time approaching the user wherein the images of the virtual tennis ball approaching the user are generated based upon the image data received by the one or more sensors;

computer code configured to determine (1) speed, position, and orientation of a hand-held device as the second function of time based upon sensor data from one or more sensors, (2) when the virtual tennis ball is hit by the user based upon the position and the orientation of the hand-held device as the second function of time and a virtual position of the tennis ball as the second function of time, and (3) an orientation of the hand-held device relative to the virtual tennis ball when the virtual tennis ball is determined to be hit by the user;

computer code configured to determine a spin of the virtual tennis ball based the speed of the hand-held device as the second function of time and the orientation of the hand-held device relative to the virtual tennis ball when the virtual tennis ball is determined to be hit by the user;

computer code configured to calculate a trajectory for the virtual tennis ball based upon the speed of the hand-held device as the second function of time, the spin of the virtual tennis ball, and the orientation of the hand-held device relative to the virtual tennis ball when the virtual tennis ball is determined to be hit by the user;

when the virtual tennis ball is determined to be hit by the user, computer code configured to trigger a haptic sensation generator in the hand-held device wherein the haptic sensation generator transmits one or more haptic sensations to the user which mimic a feel of the real tennis ball being hit; and computer code configured to control, based upon the trajectory, generation of second images of the virtual tennis ball which are output to the display worn on the user's head and which show the virtual position of the virtual tennis ball as the second function of time after the virtual tennis ball is determined to be hit moving away from the user according to the trajectory.

21. The computer readable medium of claim 20, wherein the display and the one or more sensors worn on the user's head are mounted to glasses worn by the user.

22. The computer readable medium of claim 20, wherein received image data is from a single camera further comprising computer code configured to determine a distance from the single camera to the real tennis ball based upon the image data as the first function of time.

23. The computer readable medium of claim 20, wherein the image data is from two cameras worn by the user further comprising computer code configured to determine a distance of real tennis ball from the user as the first function of time based upon the image data.

24. The computer readable medium of claim 20, further comprising computer code configured to determine a position of the user as the first function of time when the real tennis ball is hit towards the user.

25. The computer readable medium of claim 24, wherein the position of the user as the first function of time is determined using one or more accelerometers worn by the user, the image data or the one or more accelerometers and the image data.

26. The computer readable medium of claim 20, further comprising computer code for receiving sound data from a microphone when the user hits the real tennis ball with a real tennis racquet; and computer code for outputting a sound when the virtual tennis ball is hit wherein the sound is based upon the sound data.

27. The computer readable medium of claim 20, wherein the one or more sensors from which the sensor data is received are coupled to a real tennis racquet.

28. The computer readable medium of claim 27, wherein the sensor data is used to determine whether the real tennis racquet is being held with one or two hands.

29. The computer readable medium of claim 27, wherein the sensor data is used to determine forces and vibrations which the user feels while holding the real tennis racquet.

30. The computer readable medium of claim 1, wherein the one or more haptic sensations are based the speed of the hand-held device as the function of time and the orientation of the hand-held device relative to the virtual tennis ball when the virtual tennis ball is determined to be hit by the user.

31. A system, comprising:
one or more sensors configured to sense movement of a hand-held device and to provide sensor data indicative of the sensed movement;
a display worn on a head of a user;
a haptic sensor generator coupled to the hand-held device; and
a logic device configured to control the display to deliver images of a virtual tennis ball into at least one eye of the user, the logic device configured to determine a speed and a position of the hand-held device based upon the sensor data as the hand-held device is swung by the user, the logic device configured to determine when the virtual tennis ball is hit by the user based upon the determined position and to determine an orientation of the hand-held device based upon the sensor data when the virtual tennis ball is determined to be hit by the user, wherein the logic device is configured to determine a spin of the virtual tennis ball based upon the speed of the hand-held device and the orientation of the hand-held device when the virtual tennis ball is determined to be hit by the user, wherein the logic device is configured to a calculate a trajectory for the virtual tennis ball based upon the speed of the hand-held device, the spin of the virtual tennis ball, and the orientation of the hand-held device relative to the virtual tennis ball when the virtual tennis ball is determined to be hit by the user, wherein the logic device is configured to trigger the haptic sensation generator to transmit one or more haptic sensations to the user which mimic a feel of a real tennis ball being hit when the virtual tennis ball is determined to be hit by the user, wherein the logic device is further configured to control the display based upon the calculated trajectory to deliver images of the virtual tennis ball into at least one eye of the user such that the virtual tennis ball appears to be moving away from the user according to the calculated trajectory.

32. The system of claim 31, wherein the one or more haptic sensations are based upon the speed of the hand-held device.

33. The system of claim 32, wherein the one or more haptic sensations are based upon the orientation of the hand-held device relative to the virtual tennis ball when the virtual tennis ball is determined to be hit by the user.

34. The system of claim 33, wherein the one or more haptic sensations are based upon a position of the hand-held device relative to the virtual tennis ball when the virtual tennis ball is determined to be hit by the user.

35. A method, comprising:
sensing movement of a hand-held device by one or more sensors thereby providing sensor data indicative of the sensed movement;
controlling a display worn on a head of user to deliver images of a virtual tennis ball into at least one eye of the user;
determining with a logic device a speed and a position of the hand-held device based upon the sensor data as the hand-held device is swung by the user;
determining with the logic device when the virtual tennis ball is hit by the user based upon the determined position of the hand-held device;
determining with the logic device an orientation of the hand-held device based upon the sensor data when the virtual tennis ball is determined to be hit by the user;
determining with the logic device a spin of the virtual tennis ball based upon the speed of the hand-held device and the orientation of the hand-held device when the virtual tennis ball is determined to be hit by the user;

calculating with the logic device a trajectory for the virtual tennis ball based upon the speed of the hand-held device, the spin of the virtual tennis ball, and the orientation of the hand-held device when the virtual tennis ball is determined to be hit by the user;

triggering with the logic device a haptic sensation generator to transmit one or more haptic sensations to the user which mimic a feel of a real tennis ball being hit when the virtual tennis ball is determined to be hit by the user; and controlling the display based upon the calculated trajectory to deliver images of the virtual tennis ball into at least one eye of the user such that the virtual tennis ball appears to be moving away from the user according to the calculated trajectory.

36. The system of claim 35, wherein the one or more haptic sensations are based upon the speed of the hand-held device.

37. The system of claim 36, wherein the one or more haptic sensations are based upon the orientation of the hand-held device relative to the virtual tennis ball when the virtual tennis ball is determined to be hit by the user.

38. The system of claim 37, wherein the one or more haptic sensations are based upon a position of the hand-held device relative to the virtual tennis ball when the virtual tennis ball is determined to be hit by the user.

* * * * *